United States Patent
Shimizu et al.

(10) Patent No.: US 8,142,285 B2
(45) Date of Patent: Mar. 27, 2012

(54) GAME SYSTEM AND GAME PROGRAM MEDIUM

(75) Inventors: Takao Shimizu, Kyoto (JP); Yoshiaki Koizumi, Kyoto (JP); Takeshi Hayakawa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 617 days.

(21) Appl. No.: 11/117,486

(22) Filed: Apr. 29, 2005

(65) Prior Publication Data

US 2005/0245315 A1 Nov. 3, 2005

(30) Foreign Application Priority Data

Apr. 30, 2004 (JP) .................................. 2004-135722

(51) Int. Cl.
*A63F 9/24* (2006.01)
(52) U.S. Cl. ........... 463/36; 463/35; 463/37; 273/148 R; 273/148 B
(58) Field of Classification Search .............. 434/307 A, 434/308, 365; 463/1, 47, 7, 35, 37, 31, 33; 273/148 B
See application file for complete search history.

(56) References Cited

U.S. PATENT DOCUMENTS

| | | | | |
|---|---|---|---|---|
| 3,728,480 | A * | 4/1973 | Baer | 463/5 |
| 4,305,131 | A * | 12/1981 | Best | 715/716 |
| 5,149,104 | A * | 9/1992 | Edelstein | 463/31 |
| 5,766,077 | A * | 6/1998 | Hongo | 463/30 |
| 5,855,483 | A * | 1/1999 | Collins et al. | 434/322 |
| RE36,387 | E * | 11/1999 | Rosenberg et al. | 702/139 |
| 6,306,039 | B1 * | 10/2001 | Kaji et al. | 463/42 |
| 6,319,121 | B1 * | 11/2001 | Yamada et al. | 463/8 |
| 6,342,665 | B1 * | 1/2002 | Okita et al. | 84/609 |
| 6,417,436 | B1 * | 7/2002 | Beyoung-Wook | 84/600 |
| 6,485,369 | B2 * | 11/2002 | Kondo et al. | 463/43 |
| 6,538,666 | B1 * | 3/2003 | Ozawa et al. | 715/728 |
| 6,586,666 | B2 * | 7/2003 | Abe | 84/477 R |
| 6,623,358 | B2 * | 9/2003 | Harima | 463/31 |
| 6,645,067 | B1 * | 11/2003 | Okita et al. | 463/7 |
| 6,666,764 | B1 * | 12/2003 | Kudo | 463/8 |
| 6,729,960 | B1 * | 5/2004 | Matsuno | 463/30 |
| 7,070,500 | B1 * | 7/2006 | Nomi et al. | 463/7 |
| 7,331,856 | B1 * | 2/2008 | Nakamura et al. | 463/7 |

(Continued)

FOREIGN PATENT DOCUMENTS

JP 8-155146 6/1996

(Continued)

OTHER PUBLICATIONS

Dengeki Gamecube(Media Works Inc.), Jan. 1, 2004, pp. 52-53.

(Continued)

*Primary Examiner* — Xuan Thai
*Assistant Examiner* — Bruk Gebremichael
(74) *Attorney, Agent, or Firm* — Nixon & Vanderhye P.C.

(57) ABSTRACT

A game system is composed by connecting a game apparatus with a monitor and a percussion type controller. A game player beats a first beating operation surface or a second beating operation surface to input an operation signal from the controller to the game apparatus. In the game apparatus, in response to the operation signal, a player character in a virtual world displayed on the monitor is moved in a left or a right direction. Furthermore, when a sound, input by clapping and so on in the vicinity of a microphone of the controller, is present, the game apparatus generates a shock wave from a position of the player character. By the shock wave, a predetermined change occurs, such as returning an enemy character to its initial position, gathering fairies in a form of block, and so forth.

20 Claims, 12 Drawing Sheets

U.S. PATENT DOCUMENTS

| | | | |
|---|---|---|---|
| 2002/0072409 A1* | 6/2002 | Nishizawa et al. ............. 463/36 |
| 2002/0088337 A1* | 7/2002 | Devecka ......................... 84/743 |
| 2002/0128070 A1* | 9/2002 | Miyamoto et al. .............. 463/43 |
| 2002/0178011 A1* | 11/2002 | Yotoriyama et al. .......... 704/275 |
| 2003/0011620 A1* | 1/2003 | Moriyama .................... 345/619 |
| 2003/0022715 A1* | 1/2003 | Okubo ............................ 463/31 |
| 2003/0040364 A1* | 2/2003 | Yabe et al. ...................... 463/43 |
| 2003/0148810 A9* | 8/2003 | Nishizawa et al. ............. 463/31 |
| 2003/0166413 A1* | 9/2003 | Hayashida et al. ............. 463/30 |
| 2003/0207704 A1* | 11/2003 | Takahashi et al. ................ 463/1 |
| 2004/0110561 A1* | 6/2004 | Kawamura ...................... 463/35 |
| 2004/0147300 A1* | 7/2004 | Seelig et al. ...................... 463/1 |
| 2004/0248631 A1* | 12/2004 | Hirai ................................. 463/4 |
| 2005/0085297 A1* | 4/2005 | Onoda et al. ................... 463/37 |
| 2005/0130740 A1* | 6/2005 | Onoda et al. ................... 463/36 |

FOREIGN PATENT DOCUMENTS

| | | |
|---|---|---|
| JP | 8-180022 | 7/1996 |
| JP | 10-085452 | 4/1998 |
| JP | 2000-288241 | 10/2000 |
| JP | 2000-288245 | 10/2000 |
| JP | 2002-85617 | 3/2002 |
| JP | 2002-85834 | 3/2002 |
| JP | 2002-248261 | 9/2002 |
| JP | 2003-5789 | 1/2003 |
| JP | 2003-412468 | * 12/2003 |

OTHER PUBLICATIONS

The playstation Books Namco Museum vol. 1 Perfect Guide (Softbank) Jan. 11, 1996, pp. 9.

"Picachu Genkidechu operation guide" published by Nintendo Co. Ltd., on Dec. 12, 1998—Partial English Translation (3 pages).

"Donkey Conga operation guide" published by Nintendo Co. Ltd., on Dec. 12, 2003—Partial English Translation.

* cited by examiner

FIG. 7

OPERATION SIGNAL

| (000) Tx | b7 | b6 | b5 | b4 | b3 | b2 | b1 | b0 |
|---|---|---|---|---|---|---|---|---|
| 1st byte | 0 | 0 | ORG_CH | START | Y | X | B | A |
| 2nd byte | FIN | L | R | Z | UP | DOWN | RIGHT | LEFT |
| 3rd byte | CONTROL STICK ANALOG X[7:0] | | | | | | | |
| 4th byte | CONTROL STICK ANALOG Y[7:0] | | | | | | | |
| 5th byte | C STICK ANALOG X[7:0] | | | | | | | |
| 6th byte | C STICK ANALOG Y[7:0] | | | | | | | |
| 7th byte | L TRIGGER[7:0] | | | | | | | |
| 8th byte | R TRIGGER[7:0] | | | | | | | |

GAME SYSTEM AND GAME PROGRAM MEDIUM

FIELD OF THE INVENTION

The illustrative embodiments relate to a game system. More specifically, the illustrative embodiments relate to a game system utilizing a controller for outputting an operation signal according to a drumming operation by an operator, and a game program medium.

BACKGROUND AND SUMMARY OF THE INVENTION

Description of the Prior Art

A conventional game apparatus adopts push-button switches and a joystick operable by fingers. A game apparatus of this kind is disclosed in a Japanese Patent Laying-open No. 2000-288245. The game apparatus disclosed in the Japanese Patent Laying-open No. 2000-288245 is for controlling a movement of a character according to an operation of the joystick and the push-button switches by a player.

Furthermore, a game apparatus utilizing a sound input is disclosed in a Japanese Patent Laying-open No. 2002-85834, and "Picachu Genkidechu operation guide" published by Nintendo Co. Ltd., on Dec. 12, 1998. In the Japanese Patent Laying-open No. 2002-85834, a game apparatus provided with a manual operating piece such as a button, a lever, etc. and a microphone is disclosed. In the game apparatus, a movement of the character is changed by an operation of the manual operating piece, a manner of executing the game is changed by a sound input to the microphone. In the "Picachu Genkidechu operation guide" published by Nintendo Co. Ltd., on Dec. 12, 1998, a game apparatus is disclosed, recognizing a sound input to the microphone to control a movement of the character. In the game apparatus, an operation of the push-button switch is utilized as a subsidiary.

Furthermore, a game utilizing a controller for outputting an operation signal according to a drumming operation by an operator is disclosed in "Donkey Conga operation guide" published by Nintendo Co. Ltd., on Dec. 12, 2003. The game disclosed in the "Donkey Conga operation guide" published by Nintendo Co. Ltd., on Dec. 12, 2003 is a game called "Donkey Conga (product name)" being on the market by the applicant of this invention, and the game is advanced by drumming a beating surface of a percussion type controller (called "taru-conga (product name)"), or clapping in the vicinity of a microphone called as a clapping sensor provided in the controller at timings when musical notes which come from the right of a screen in synchronous with music are superposed on a ring.

In the game apparatus disclosed in the Japanese Patent Laying-open No. 2000-288245, the player performs game play by using the joystick and the push-button switches operable with fingers, thus cannot enjoy the operating action itself, and it becomes a dreary game operation because the operating action itself is an act like a work. This is true for the operation of the button, the lever, the push-button switches of the game apparatus disclosed in the Japanese Patent Laying-open No. 2002-85834 and the "Picachu Genkidechu operation guide" published by Nintendo Co. Ltd., on Dec. 12, 1998.

In the game apparatus disclosed in the Japanese Patent Laying-open No. 2002-85834 and the "Picachu Genkidechu operation guide" published by Nintendo Co. Ltd., on Dec. 12, 1998, a sound input to the microphone is utilized for the game. However, the game operation to be operated with fingers by the button, the lever, the push-button switch, etc. and the sound input to the microphone are independent of each other, and are not associated with each other.

In addition, the game disclosed in the "Donkey Conga operation guide" published by Nintendo Co. Ltd., on Dec. 12, 2003 is merely a so-called "music game" for performing a beating operation and clapping according to the flow of the musical notes on the game screen. The so-called "music game" requires the player to operate at an operation timing indicated by the flow of the musical notes, and thus, the player operates in a determined operating procedure, cannot freely move the character within the virtual world. That is, a degree of freedom of the game operation is low.

Therefore, it is an aspect of the illustrative embodiments to provide a novel game system.

Another aspect of the illustrative embodiments is to provide a game system capable of applying enjoyment in a game operation itself.

A third aspect of the illustrative embodiments is to provide a game system allowing a player to perform a game operation having varieties and association with both hands.

A further aspect of the illustrative embodiments is to provide a game system capable of advancing a game with an unconventional new sense by controlling the movement of a game character appearing in a virtual world by use of a percussion type controller.

A game system according to claim 1 is a game system for advancing a game by causing a first character to appear in a virtual world on the basis of a game program, comprising: a controller having a first operation surface and a second operation surface, each of which is subjected to elastic deformation by a beating operation by the hands of a player, for outputting an operation signal according to the beating operation, a first processing means for executing a first movement of the first character in response to the operation signal from the controller, a sound input means for input of a sound signal, and a second processing means for generating a predetermined change in the virtual world when the sound input from the sound input means is present.

A game system is composed by connecting a monitor (30: a reference numeral corresponding to a "preferred embodiment", and so forth) and a percussion type controller (100) with a game apparatus (12), for example. The controller has a first beating operation surface (120) and a second beating operation surface (122), and according to a beating operation of each of the beating operation surfaces by the game player, the operation signal is input from the controller to the game apparatus (12). In the game apparatus, the first processing means (36, S3, S7, S11), for example, moves the first character (player character 74 operable by the game player, for example) in the virtual world displayed on the monitor in response to the operation signal. Furthermore, when the sound input is present, the second processing means (36, S23, S27) outputs a shock wave from a position of the first character, for example, and by the shock wave, a predetermined change is generated, such as returning an enemy character to an initial position, or gathering fairies in a form of block, and so forth.

According to an aspect of the illustrative embodiments, it is possible to control the movement of a character in the virtual world with a new sense, such as beating a beating operation surface of the controller, dissimilar to the conventional controller operation with fingers. Therefore, the player can perform a game operation, enjoying an operating action itself, with a sense as if he moves his body, dissimilar to the operation with fingers. Furthermore, when the sound input is present, the change occurs in the virtual world, and therefore, in a case of applying the sound input by the beating operation and the clapping in succession thereto, the above-described sense as if he moves his body is further increased. That is, in order to perform a beating operation, the player has to swing his hands down, and the player can shift from this to a sound input by clapping. Thus, it is possible to mix both the beating operation and the clapping operation together, allowing an interesting game operation by mixing both of the operations. Therefore, a the new aspect of the game can be appreciated over the conventional system of controlling a character by the operation with only the fingers and applying an instruction to the character with only the sound.

It is noted that the clapping in the specification, according to the illustrative embodiments, means an act of outputting a sound by clapping both hands, and is not limited to the act of continuously clapping the both hands a plurality of times and includes an act of clapping once.

Another aspect of an illustrative embodiment is a game system characterized in that the first operation surface and the second operation surface have a size including a circle having a diameter of 3 cm when viewed from a above.

In this aspect of the illustrative embodiments, the size of the operation surface is a circle having a diameter of 3 cm, and this allows the player to easily perform the beating operation, surely causing the beating operation by the player.

Still another aspect of an illustrative embodiment is a game system characterized in that the controller imitates a shape of a percussion instrument.

In this aspect, it is also possible to ensure the beating operation by the player.

A further aspect of the illustrative embodiments is characterized in that the first processing means neglects a continuous operation signal from the controller within a predetermined time interval.

It is also possible in this aspect to ensure the beating operation by the player. Because in the absence of this aspect, a continuous depression of the operation surface enables an acceleration of the character, for example, and therefore, the player may not repeat the beating operation.

According to an additional aspect of the illustrative embodiments a sound input means is provided on the controller.

In this aspect, the sound input is performed to the controller having the beating operation surface, and this allows the player to easily perform a game operation by mixing the beating operation and the sound input (clapping). Thus, it is possible to provide the player to an enjoyable game by allowing him to perform the beating operation and the sound input with both hands (clapping).

According to another aspect of the illustrative embodiments the sound input means is provided in proximity to the first operation surface and the second operation surface.

In this aspect it is possible to lead the player to an enjoyable game by allowing him to perform the beating operation and the sound input (clapping).

According to a further aspect of the illustrative embodiments the controller includes a first housing (114) for supporting the first operation surface, a second housing (116) for supporting the second operation surface, and a connecting portion (118) for connecting the first housing and the second housing, and the sound input means includes a microphone (124) provided in the connecting portion.

In this aspect it is possible to lead the player to an enjoyable game by allowing him to perform the beating operation and the sound input (clapping).

Another aspect of the illustrative embodiments is characterized in that the second processing means neglects, when the operation signal is present from the controller, a sound input from the sound input means within a predetermined time period from the operation signal from the controller.

According to this aspect, in a case that a sound is generated by a beating operation of the controller, by neglecting the sound input, it is possible to prevent an operation by an unintended sound input by the player from occurring.

According to a further aspect of the illustrative embodiments the second processing means includes a movement means for executing a second movement relating to the first character when the sound input is present.

According to this aspect, the second processing means (36, S19) can perform the second movement, such as generating a shock wave from the position of the first character (player character), and so forth in response to the sound input.

According to a further aspect of the illustrative embodiments the first processing means moves the first character in the virtual world depending on at least an operation signal by a beating operation on the first operation surface and an operation signal by a beating operation on the second operation surface from the controller.

According to this aspect, it is possible to provide a game according to an unconventional fresh game operation capable of moving the player character by the beating operation of the operation surface of the controller.

According to a further aspect of the illustrative embodiments the first processing means includes a first movement means for moving the first character in a first direction according to an operation signal by a beating operation on the first operation surface, and a second movement means for moving the first character in a second direction according to an operation signal by a beating operation on the second operation surface.

According to this aspect, it is possible to provide a game according to an unconventional novel game operation capable of moving the player character to the right and left by the beating operation on the operation surfaces of the controller.

Another aspect of the illustrative embodiments has a second character generating means for causing a second character to appear in a predetermined position of the virtual world, wherein a second processing means generates a predetermined change in the virtual world according to a relative positional relationship between the first character and the second character in the virtual world when the sound input is present.

According to this aspect, the second character generating means (36) causes the second character (78, 80) to appear in a predetermined position in the virtual world, and the second processing means generates (S23, S27) a predetermined change in the virtual world according to a relative positional relationship between the first character and the second character in the virtual world (S21, S25) when the sound input (clapping) is present. Thus, the player performs a sound input by clapping while changing the positional relationship according to the beating operation, and it is necessary to rhythmically mix the beating operation and the clapping operation, producing an interesting game operation.

It is noted that as the "predetermined change in the virtual world" here, in addition to the examples of returning the enemy character to the initial position and an example of the fairies described in the embodiment, there are examples of allowing the player to acquire an item (second character) satisfying a relative positional relationship, and of damaging the enemy character (second character) satisfying a relative positional relationship, and so forth.

According to a further aspect of the illustrative embodiments the first processing means includes a third movement means for moving the first character when neither of the operation signal by the beating operation on the first operation surface nor the operation signal by the beating operation on the second operation surface is present.

According to this embodiment, the first character (player character) automatically moves by the third movement means (36, S13) even when no beating operation from either of the first operation surface or the second operation surface is present. That is, since a relative positional relationship between the first character and the second character is automatically changed, without performing the beating operation, the player can perform a sound input by clapping with a precise timing when a relative positional relationship between the first character and the second character becomes a predetermined state. Furthermore, especially, in a case that a plurality of second characters successively appear, a second character in a predetermined state satisfying a relative positional relationship with the first character appears one after another. Thus, the player has to rhythmically perform a sound input by clapping, capable of realizing an interesting game operation.

For example, the moving speed and moving acceleration, etc. of the first character within the virtual world is determined by the beating operation on the first operation surface or the beating operation on the second operation surface. Then the third movement means, even after no beating operation on the first operation surface or the second operation surface is present, inertially moves the first character on the basis of the determined moving speed and moving acceleration for a predetermined time period. As understood from this example, the third movement means is not limited to one that moves the first character only if neither the beating operation on the first operation surface nor the beating operation on the second operation surface is present.

That is, although the first character is always moved straight with constant velocity when no beating operation is present in this embodiment, the third movement means is adequately changeable such as inertially moving the first character even after no beating operation input, and then, stopping it, and so forth.

According to a further aspect of the illustrative embodiments the second processing means performs a predetermined process in association with the second character existing within the predetermined area, taking a position of the first character in the virtual world as a reference, when the sound input is present.

According to this aspect, since the second processing means performs the predetermined process on the second character within the predetermined area when the sound input is present (S23, S27), the player performs a sound input by clapping while changing the positional relationship by the beating operation, and it is necessary to rhythmically mix the beating operation and the clapping operation, which produces an interesting game operation.

Another aspect of the illustrative embodiments has a third processing means for controlling a movement of the second character, wherein the second processing means changes the movement of the second character by the third processing means when a sound input is present.

According to this aspect of the invention, the third processing means (36, S17) controls the movement of the second character. Since the second processing means (36, S21, S27) changes the movement of the second character by the third processing means, the movement of the second character can be changed by the sound input.

According to a further aspect of the illustrative embodiments the first movement is a movement for moving the first character in the virtual world, the second character generating means arranges the second character in the initial position of the virtual world, the third processing means moves the second character from the initial position toward the first character when the first character exists in the predetermined area of the virtual world, and the second processing means returns the second character to the initial position when the sound input is present.

According to this embodiment, the second character (enemy character, for example) is arranged in the initial position in the virtual world by the character arranging means (36, 70b), and the third processing means (36, S27) controls the movement of the second character, and moves the second character from the initial position toward the first character when the first character exists in the predetermined area of the virtual world. The second character applies a minus game evaluation when contacting the first character, and interrupts a movement of the first character. When the player applies a sound input by clapping, for example, the second processing means (36, S23) returns the second character to the initial position, and therefore, it is possible to prevent the above-described minus evaluation and interruption from occurring. Accordingly, it is possible to realize a more enjoyable game requiring both the beating operation and the sound input.

Another aspect of the illustrative embodiments causes a game system, including a controller for outputting an operation signal according to a beating operation and a sound input means to execute a game in which a first character appears in a virtual world, to function as a first processing means for executing a first movement of the first character in response to the operation signal from the controller, and as a second processing means for generating a predetermined change in the virtual world when a sound input from the sound input means is present.

According to a further aspect of the illustrative embodiments the first processing means moves the first character within the virtual world according to at least an operation signal by a beating operation on the first operation surface and an operation signal by a beating operation on the second operation surface of the controller.

An additional aspect of the illustrative embodiments further causes the game system to function as a second character generating means for causing the second character to appear in a predetermined position of the virtual world, and as a second processing means generating a predetermined change in the virtual world according to a relative positional relationship between the first character and the second character in the virtual world when the sound input is present.

According to the illustrative embodiments, it is possible to control the game character with a new sense different from the conventional controller operation with fingers by utilizing both of the beating operation and the sound input.

The above described features and aspects of the illustrative embodiments will become more apparent from the following detailed description when taken in conjunction with the accompanying drawings.

BRIEF DESCRIPTION OF THE DRAWINGS

FIG. 7 is an illustrative view showing a format of an operation signal input from the percussion type controller to a game apparatus;

DETAILED DESCRIPTION OF THE PREFERRED EMBODIMENTS

Figure 1:
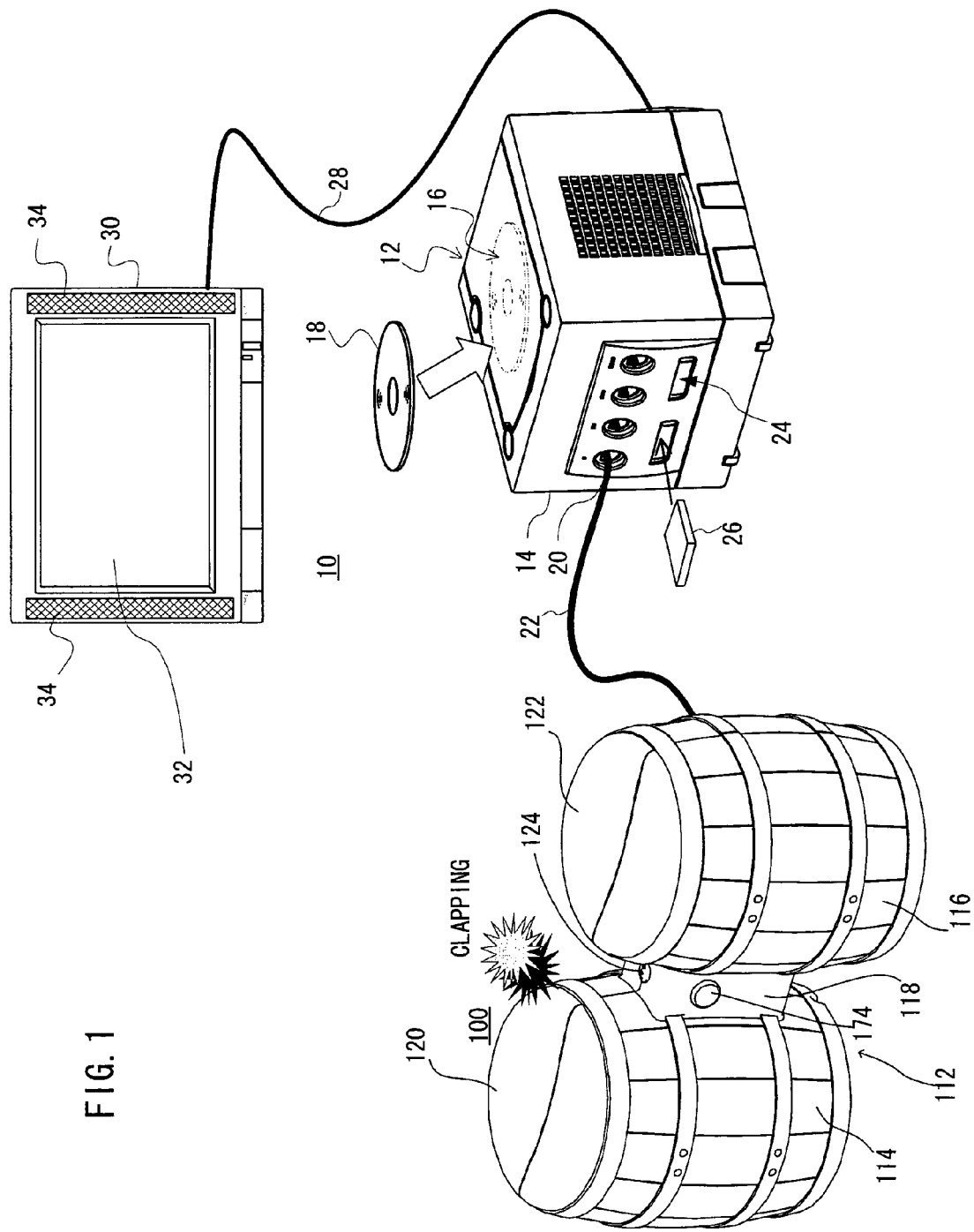
FIG. 1 is an illustrative view showing a game system of one embodiment of the present invention.

Referring to FIG. 1, a video game system 10 of this embodiment includes a video game apparatus 12. The video game apparatus 12 includes an approximately cubic housing 14, and the housing 14 is provided with an optical disk drive 16 on an upper edge thereof. An optical disk 18 which is one example of an information storage medium such as CD-ROM, DVD-ROM for storing a game program, etc. is loaded on the optical disk drive 16. The housing 14 is provided with a plurality of connectors 20 (four in this embodiment) on a front surface thereof. These connectors 20 are for connecting a controller 100 to the video game apparatus 12 by a cable 22 integrated into the controller 100, and can connect up to the four controllers 100 to the video game apparatus 12 in this embodiment.

It is noted that the controller 100 is connected to the video game apparatus 12 by the cable 22 integrated into the controller 100 in this embodiment. However, the controller 100 may be connected to the video game apparatus 12 by another method such as a wireless manner via an electromagnetic wave (e.g., radio wave or infrared ray).

At least one (two in this embodiment) memory slot 24 is provided below the connectors 20 on the front surface of the housing 14 of the video game apparatus 12. A memory card 26 is inserted to this memory slot 24. The memory card 26 is utilized for loading the game program and etc. read from the optical disk 18 so as to temporarily store it, or storing (saving) game data (e.g., result of a game) of the game that the player plays by utilizing the game system 10.

On a rear surface of the housing 14 of the video game apparatus 12, an AV cable connector (not shown) is provided, and by utilizing the connector, a monitor 30 is connected to the video game apparatus 12 through an AV cable 28. The monitor 30 is typically a color television receiver, and the AV cable 28 inputs a video signal from the video game apparatus 12 to a video input terminal of the color television, and applies a sound signal to a sound input terminal. Accordingly, a game image of a three-dimension (3D) video game, for example, is displayed on a screen 32 of the color television (monitor) 30. A game sound such as a game music, a sound effect and etc. is output from right and left speakers 34, or in a case of causing a surround effect even if two speakers, a game sound including a surround sound is output.

In the game system 10, a user or a game player first turns on an electric power supply of the game apparatus 12 in order to play a game (or another application), and then selects a suitable optical disk 18 storing a video game (or another application intended to play), and loads the optical disk 18 on the disk drive 16 of the video game apparatus 12. In response thereto, the game apparatus 12 starts to execute the video game or another application on the basis of software stored in the optical disk 18. The user operates the controller 100 for applying an input to the game apparatus 12. In response thereto, the game or another application is started, and a moving image character (player character) can further be moved in different directions.

Here, referring to FIG. 1-FIG. 15, the conga-type controller 100 of this embodiment is described in detail. The controller 100 includes a body 112, and the body 112 consists of a first housing 114 in the form of a barrel, a second housing 116 having approximately the same size and the same shape as the first housing 114, and a third housing 118 that couples the first housing 114 and the second housing 116 and is formed in the form of quadratic prism (a rectangular parallelepiped) smaller than the first housing 114 and the second housing 116.

Furthermore, on the upper surface (top surface) of the first housing 114 and the second housing 116, covers 120 and 122 are respectively provided. The areas covered by the covers 120 and 122 are areas (operating areas) or operation input surfaces to be operated (beaten) by a player or a user. That is, the operation apparatus or the controller 100 has two operation input surfaces on the upper surface of the first housing 114 and on the upper surface of the second housing 116. For example, the covers 120 and 122 are made of rubber, and elastically changed in shape according to a beating operation by the player or the user, and then restored to an original shape. A size of the covers 120 and 122 when viewing it from a plane (a size of the shape of the cover when viewing it from above) is a size including a circle having at least a diameter of 3 cm. This allows the player to easily perform the beating operation. It is noted that the shape of the covers 120 and 122 is not limited to the circle, and any shape capable of including a circle such as an oval, a rectangle, etc. is applicable.

It is noted that as shown in FIG. 1, on the upper surface of the third housing 3, a microphone 124 is provided. In a case of providing the hole for collecting sounds, the microphone 124 is set inside of the third housing 118 or is set such that its sound collecting portion is exposed from the hole. It is noted that although the microphone 124 is provided on the third housing 118 in this embodiment, it may be provided on the first housing 114 or the second housing 116 except for its operating area to be operated by the user (operation input portion).

Figure 2:
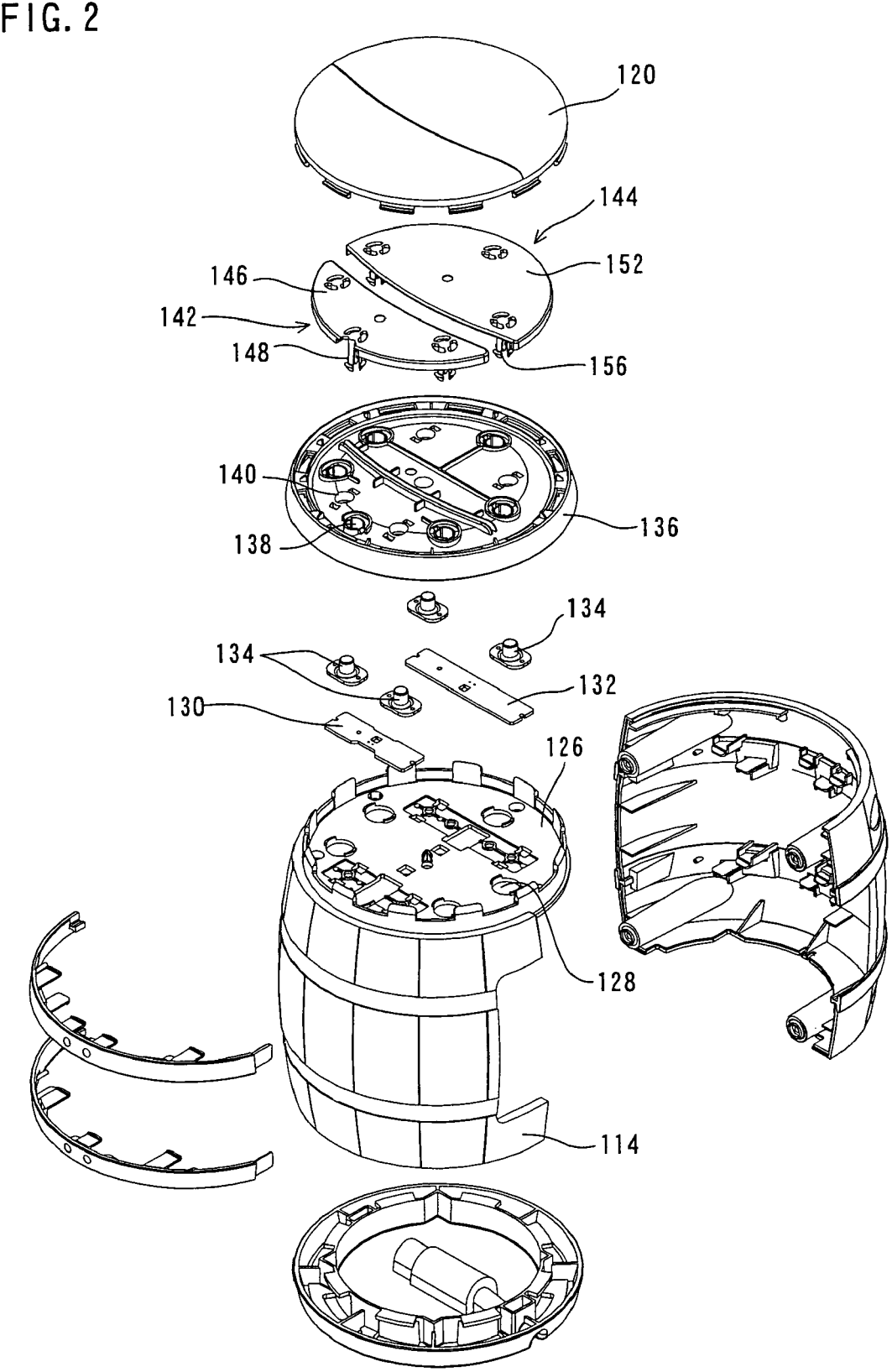
FIG. 2 is an exploded view showing a part of a percussion type controller utilized in FIG. 1 embodiment.

FIG. 2 shows an exploded view of a part of the controller 100. That is, this is an exploded view as to the first housing 114, and for the sake of simplicity, this is omitted as to the second housing 116 and the third housing 118.

Figure 4:
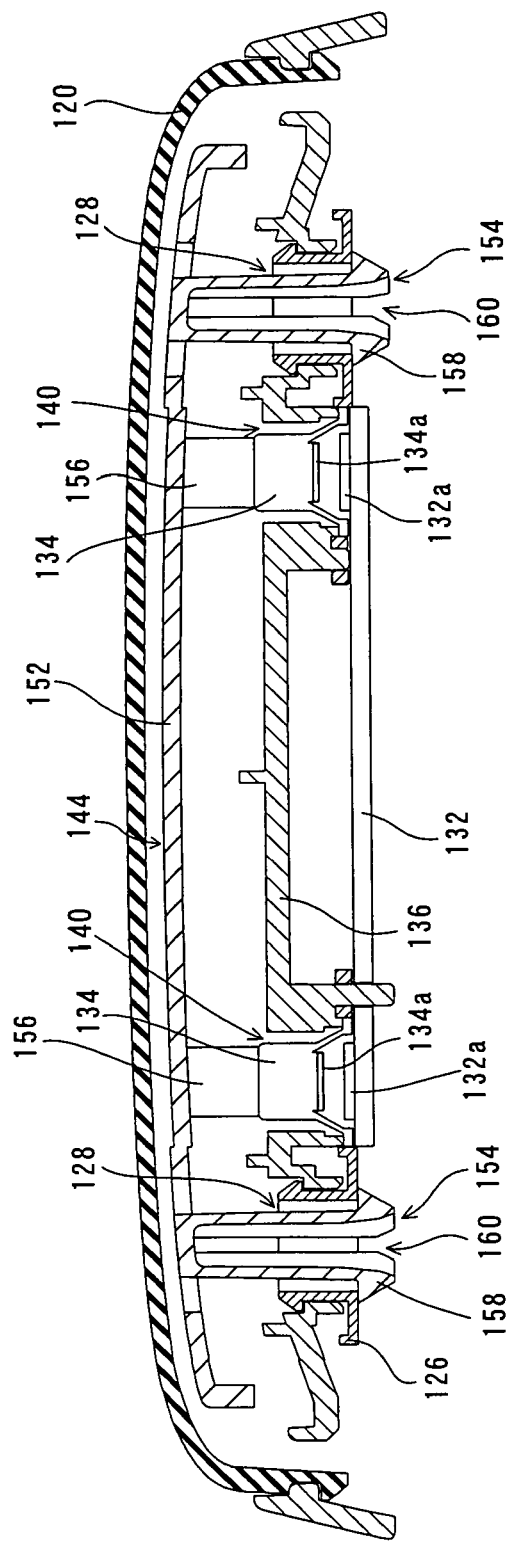
FIG. 4 is a part of a cross-sectional view of the percussion type controller at a line IV-IV in FIG. 3.
Figure 5:
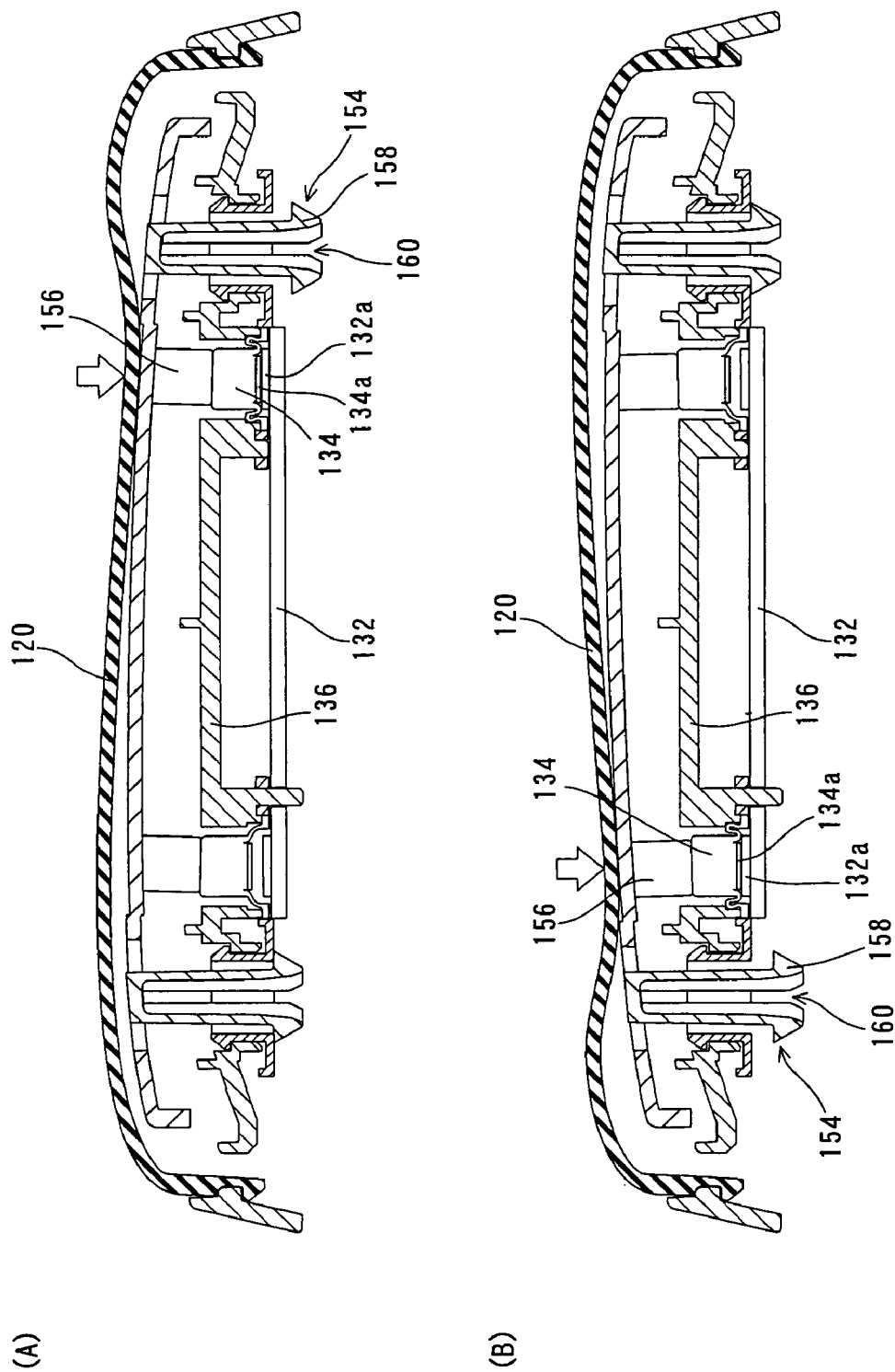
FIG. 5 is an illustrative view showing a state where a beating operation by a player is present in the cross-sectional view in FIG. 4.

Referring to FIG. 2, the first housing 114 includes an upper (ceiling) surface panel 126, and on the upper surface panel 126, switch boards 130 and 132 having a different size are provided. These switch boards 130 and 132 are fixedly arranged (housed) at predetermined positions of the upper surface panel 126. Although omitted in FIG. 2, each of the switch boards 130 and 132 has two contacts (only the contacts 132a, 132a of the switch board 132 are illustrated in FIG. 4 and FIG. 5).

On each of the switch boards 130 and 132, two rubber switches 134 are arranged, and the respective rubber switches 134 are joined to edges of depressing protrusions 150 and 154 described later. Although omitted in FIG. 2, on a rear surface of the rubber switch 134, a contact 134a is provided, and each rubber switch 134 is provided at a position opposed to each of the contacts of the switch boards 130 and 132 (see FIG. 4).

On the respective rubber switches 134, a lid 136 of the first housing 114 is provided, and this is attached on the first housing 114 so as to cover the upper surface panel 126, the switch boards 130, 132, and the rubber switches 134. The lid 136 is provided with five holes 138 that engaging protrusions 148 and 152 described later penetrate, and four holes 140 that the rubber switches 134 arranged at the positions opposed to the depressing protrusions 150 and 154 penetrate.

Figure 3:
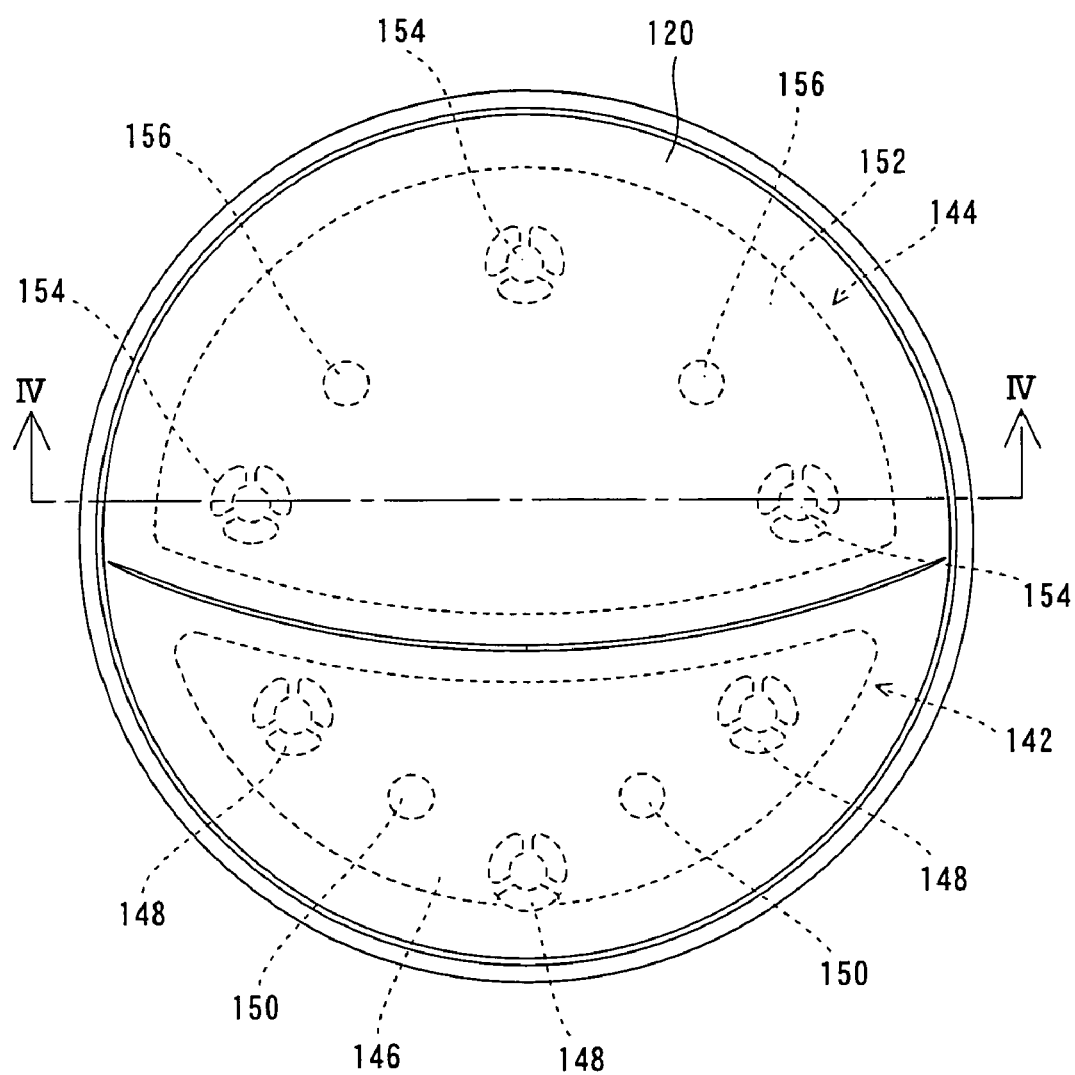
FIG. 3 is a view from above of a part of the percussion type controller.

On the lid 136, depressing members 142 and 144 having a different size (shape) are provided, and over this, the cover 120 to be attached to the lid 136 is further provided. As shown in FIG. 3 and FIG. 4 being a part of a cross-sectional view IV-IV of FIG. 3, the depressing portion 142 has its main body 146 in the form of a crescent, and is provided with three engaging protrusions 148 and two depressing protrusions 150 that are downwardly protruded from the main body 146. Furthermore, the depressing member 144 has its main body 152 in the form of a dichotomy, and is provided with three engaging protrusions 154 and two depressing protrusions 156 that are downwardly protruded from the main body 152.

FIG. 3 is a view when viewing the first housing 114 and the cover 120 from directly above. The engaging protrusions 148, the depressing protrusions 150, the engaging protrusions 154 and the depressing protrusions 156 are arranged at positions shown in FIG. 3. As understood from FIG. 3, the three engaging protrusions 148 are provided at the edges (both right and left edges and lower edge) of the main body 146 of the depressing member 142, and the two depressing protrusions 150 are provided between the three engaging protrusions 148. Furthermore, the three engaging protrusions 154 are provided at the edges (both right and left edges and upper edge) of the main body 152 of the depressing member 144, and the two depressing protrusions 156 are provided between the three engaging protrusions 154. In addition, as shown in FIG. 4, the engaging protrusion 154 (this is true for the engaging protrusion 148) penetrates the hole 138 on the lid 136 and the hole on the upper surface panel 126 such that its engaging portion 158 provided at the tip end penetrates the upper surface panel 126 (the inside of the first housing 114). It is noted that the lid 136 is attached to the upper surface panel 126, and whereby, the holes of the upper surface panel 126 are formed inside the holes 138. Furthermore, the depressing protrusions 150 and the depressing protrusions 154 are provided so as to depress the rubber switches 134 arranged within the holes 140 of the lid 136. That is, each of the rubber switches 134 is housed within the first housing 114 such that its surface (surface to be connected with the depressing protrusion 150 and the depressing protrusion 154) is exposed from the hole (140) of the first housing 114.

It is noted that the tip ends of the depressing protrusions 150 and 154 are arranged in such a manner as to be brought into contact with the rubber switches 134 as shown in FIG. 4. Or, these may be joined by a fitting structure or an adhesive or the both thereof. Accordingly, the depressing members 142 and 144 are supported by the rubber switches 134.

In addition, as shown in FIG. 3 and FIG. 4, the engaging protrusion 154 (it is true for the engaging protrusion 148) is provided with a notch (slit) 160, and thus, each of the engaging protrusions 148 and 152 is reduced in diameter when penetrating the hole of the upper surface panel 126, and then restored when having penetrated the hole. Then, the engaging portion 158 is engaged with the rear surface (inner wall of the first housing 114) of the upper surface panel 126. This makes it possible to prevent the depressing members 142 and 144 from being disengaged.

For example, as shown in FIG. 5 (A), when the player beats the right side of the controller 100 (cover 120), the cover 120 is elastically changed, and then the right side of the depressing member 144 (this is true for the depressing member 142) is apt to be depressed. At this time, the engaging portion 158 of the engaging protrusion 152 provided at the left side of the depressing member 144 is engaged with the rear surface of the upper surface panel 126. This makes it possible to prevent the depressing member 144 from being upwardly actuated. Accordingly, the depressing member 144 at the right side is downwardly actuated, and the rubber switch 134 at the right side is depressed by the depressing member 144 so as to be brought into contact with the switch board 132. That is, the contact 132a and the contact 134a are brought into contact with each other.

Furthermore, as shown in FIG. 5 (B), when the player beats the left side of the controller 100 (cover 120), the cover 120 is elastically changed, and the left side of the depressing member 144 (this is true for the depressing member 142) is apt to be depressed. At this time, the engaging portion 158 of the engaging protrusion 152 provided at the right side of the depressing member 144 is engaged with the rear surface of the upper surface panel 126. This makes it possible to prevent the depressing member 144 from being upwardly actuated. Accordingly, when the depressing member 144 at the left side is downwardly actuated, the rubber switch 134 at the left side is depressed by the depressing member 144 so as to bring the contact 134a of the rubber switch 134 into contact with the contact 132a of the switch board 132.

That is, even if the depressing member 144 (this is true for the depressing member 142) is beaten at any position (area), at least one engaging portion 158 of the engaging protrusion 154 (148) except for the engaging protrusion 154 (148) provided at the beaten area or in proximity thereto is engaged with the rear surface of the upper surface panel 126. Due to this, when a beating operation by the player is present, the depressing member 144 (142) is depressed, a contact 134a of any rubber switch 134 is sure to be brought into contact with the contact 132a of the switch board 132 (contact of the switch board 130).

More specifically, when the left half area of the controller 100 (cover 120) shown in FIG. 5 is beaten at any position, the engaging portion 158 of the engaging protrusion 154 at the right side of the depressing member 144 is engaged with the rear surface of the upper surface panel 126, the left side of the depressing member 144 is downwardly actuated, the rubber switch 134 at the left side is depressed by the depressing member 144, and the contact 134a of the rubber switch 134 is brought into contact with the contact 132a of the switch board 132 at the left side. On the contrary thereto, when the right half area of the controller 100 (cover 120) is beaten at any position, the engaging portion 158 of the engaging protrusion 154 at the left side of the depressing member 144 is engaged with the rear surface of the upper surface panel 126, the right side of the depressing member 144 is downwardly actuated, the rubber switch 134 at the right side is depressed by the depressing member 144, and the contact 134a of the rubber switch 134 is brought into contact with the contact 132a of the switch board 132 at the right side. Furthermore, when the center area of the controller 100 (cover 120) is beaten at any position, the depressing member 144 is approximately uniformly depressed at both the right and left sides, the rubber switches 134 at the right and the left sides are depressed by the depressing members 144, and thus, both of the contacts 134a of the rubber switches 134 are brought into contact with the contacts 132a of the switch boards 132.

Thus, even if the controller 100 (cover 120) is beaten at any place (area), any one of the rubber switches is sure to be depressed to output the same operation signal.

Figure 6:
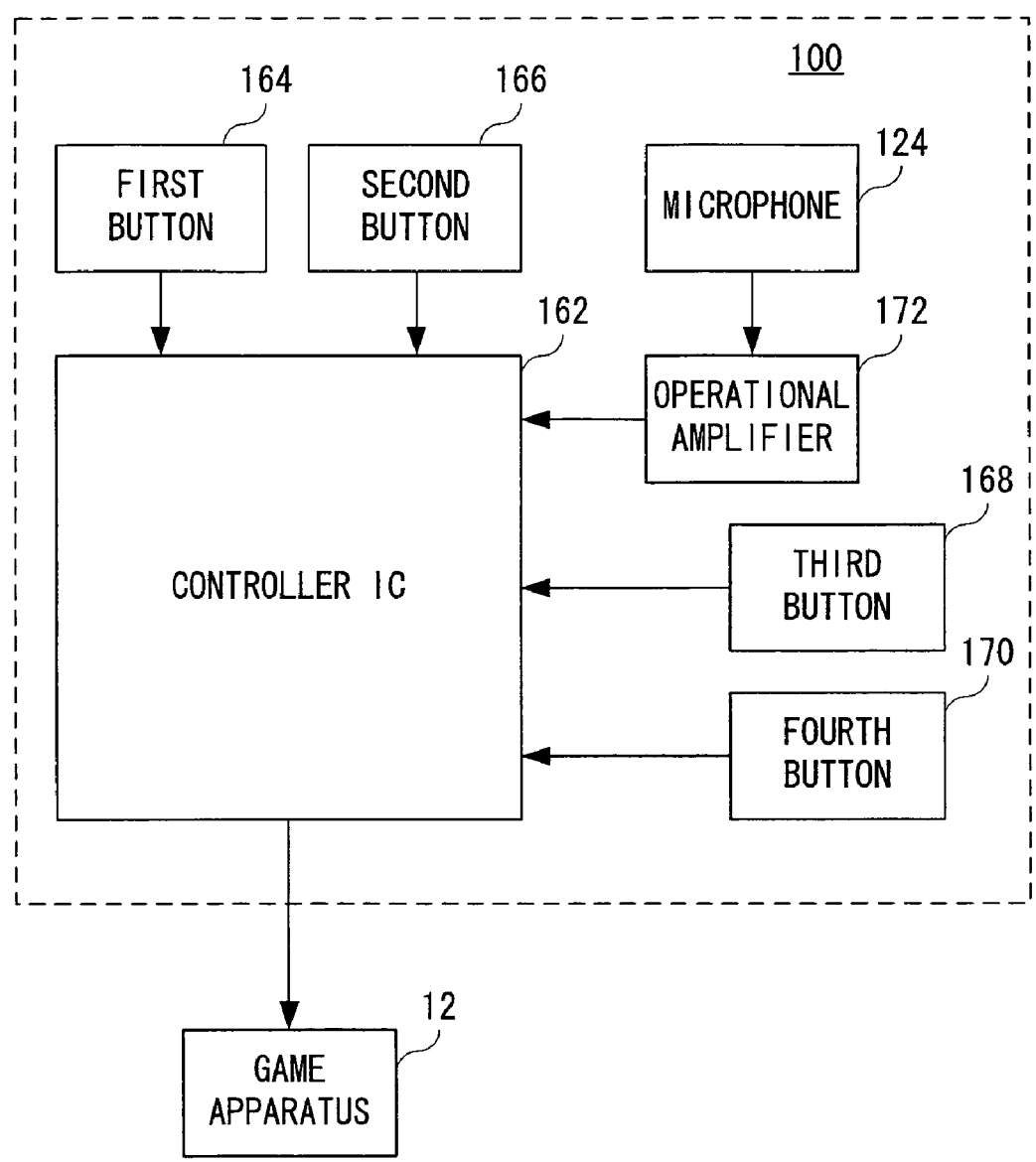
FIG. 6 is a block diagram showing an electric configuration of the percussion type controller.

FIG. 6 shows an electric configuration of the controller 100. Referring to FIG. 6, the controller 100 includes a controller IC 162, and the controller IC 162 is connected with a first button 164, a second button 166, a third button 168, and a fourth button 170. The end of the cable 38 described above to which the plug 36 is not connected is connected to the controller IC 162. Accordingly, as shown in FIG. 1, the cable 22 is inserted into the connector 20 of the game apparatus 12, and whereby, the controller IC 162 is electrically connected to the game apparatus 12 as shown in FIG. 6. Furthermore, the controller IC 162 is connected with the microphone 124 via an operational amplifier 172.

The first button 164 and the second button 166 are provided within the first housing 114. In this embodiment, the first button 164 consists of the switch board 130 and the two rubber switches 134 provided on the switch board 130 (being opposed thereto). The second button 166 consists of the switch board 132 and the two rubber switches 134 provided to be opposed to the switch board 132.

The third button 168 and the fourth button 170 are provided within the second housing 116. In this embodiment, the third button 168 is constructed similarly to the first button 164, and the fourth button 170 is constructed similarly to the second button 166.

Thus, in this controller 100, the player can perform various operations by use of any one of the first button 164—the fourth button 170 or a combination of two or more thereof. The beating operation by the player is input to the controller IC 162 as a state signal indicative of an on/off state of the first button 164—the fourth button 170. Then, an operation signal corresponding to the beating operation is output to the game apparatus 12 from the controller IC 162.

In the controller 100, when the player generates a sound by clapping or a voice, the sound is input to the microphone 124, amplified in the operational amplifier 172, and then, input to the controller IC 162. Thus, the operation signal according to the generation of the sound is output from the controller IC 162 to the game apparatus 100. For example, as shown in FIG. 1, when a clapping is present in the vicinity of the microphone 124 of the controller 100, a sound by the clapping is input to the microphone 124, and it is detected that a sound input is present when the volume thereof is equal to or larger than a threshold value.

FIG. 7 shows one example of a format of the operation signal output from the controller IC 162 to the game apparatus 12. It is noted that the operation signal has a format corresponding to a standard controller of the game apparatus 12 "GAME CUBE (trade name)" that is manufactured/marketed by the assignee of the present invention in this embodiment). Although not illustrated, the controller is provided with two analog joysticks (control stick and C stick), a cross key, an A button, a B button, an X button, a Y button, a Z button, an L trigger button, an R trigger button, and a START/PAUSE button, and so on.

As understood from FIG. 7, the operation signal consists of 8 bytes. As to the first byte (1st byte), data of "0", "0", "ORG_CH", "START", "Y", "X", "B", and "A" are written to bit 7 (b7) to bit 0 (b0), respectively. The bit 7 and the bit 6 are fixed values of "0", and to the bit 5, the data indicative of an on/off state of the setting mode "ORG_CH" is written. In this embodiment, if the setting mode "ORG_CH" is turned on, "1" is written, and if the setting mode "ORG_CH" is turned off, "0" is written. Here, the "ORG_CH" is a variable for setting a mode (setting mode) determining whether or not a standard position (original point (neutral position) of the joystick) is reset. Into the bit 4-the bit 0, data indicative of an on/off state of the START button, the Y button, the X button, the B button, and the A button are respectively written. In this embodiment, if the button is turned on, "1" is written to the relevant bit, and if the button is turned off, the "0" is written to the relevant bit.

As to the second byte (2nd byte), data of "FIN", "L", "R", "Z", "UP", "DOWN", "RIGHT", and "LEFT" are written to bit 7 (b7)-bit 0 (b0), respectively. Into the bit 7, data indicative of an on/off state of a mode "FIN" for identifying a controller is written. In this embodiment, in a case of a standard controller, "1" indicative of the on state is written, and in a case of the controller 100 (percussion type controller), "0" indicative of the off state is written. Into the bit 6-the bit 0, data indicative of an on/off state of the L trigger button, the R trigger button, the Z button, the UP button, the DOWN button, the RIGHT button, and the LEFT button are respectively written. The data values to be written to the respective bits are the same as in the above-described Y button, and so on.

It is noted that the UP button, the DOWN button, the RIGHT button, and the LEFT button correspond to the respective buttons of the cross key.

To the third byte (3rd byte), data indicative of an amount of inclination of the control stick toward an X direction is written by binary data utilizing 8 bits in all. Accordingly, the inclination toward the X direction is represented by numerals in the "00000000" ("0" in a decimal numeral)-"11111111" ("255") range. For example, if the control stick is inclined to the left, it is close to "0", and if the control stick is inclined to the right, it is close to "255".

It is noted that in a default setting, the neutral position is represented by "128 (0100000)", and if the value is smaller than this, it is shown that the control stick is inclined toward the left direction, and if the value is greater than this, it is shown that the control stick is inclined toward the right direction. The amount of the inclination can be detected by a difference between the obtained data value and the data value at the neutral position.

To the fourth byte (4th byte), data indicative of an amount of inclination of the control stick toward the Y direction is written by binary data utilizing 8 bits in all. Accordingly, the inclination toward the Y direction is also represented by the numerals in the "00000000" ("0" in a decimal numeral) to "11111111" ("255") range. For example, if the control stick is downwardly inclined, the value is close to "0", and if the control stick is upwardly inclined, the value is close to "255".

It is noted that in a default setting, the neutral position is represented by "128 (0100000)", and if the value is smaller than this, it is shown that the control stick is downwardly inclined, and if the value is greater than this, it is shown that the control stick is upwardly inclined. The amount of the inclination can be detected by a difference between the obtained data value and the data value at the neutral position.

To the fifth byte (5th byte), data indicative of an amount of inclination of the C stick toward the X direction is written by binary data utilizing 8 bits in all. Furthermore, to the sixth byte (6th byte), data indicative of an amount of inclination of the C stick toward the Y direction is written by binary data utilizing 8 bits in all. These data value is decided similarly to the above-described control stick.

To the seventh byte (7th byte), data indicative of an amount of the depression of the L trigger button is written by binary data utilizing 8 bits in all. The data value when the L trigger button is not depressed is "00000000", and the data value is rendered greater in accordance with the amount of the depression. That is, the data value when depressed at the maximum is "11111111".

To the eighth byte (8th byte), data indicative of an amount of the depression of the R trigger button is written by binary data utilizing 8 bits in all. The data value is decided similarly to the above-described L trigger button.

The format of the operation signal is shown like this. The controller 100 is not provided with the joystick, the Y button, the X button, the B button, and the A button, but outputs to the game apparatus 12 an operation signal indicative of an on/off state of the first button 164—the fourth button 170, an operation signal in response to a generation of the sound to the microphone 124, and a controller identifying mode, and therefore, the data of the first byte to the third byte are utilized, for example. More specifically, with respect to the first byte, data indicative of an on/off state of the first button 164 is written to the bit 3, data indicative of an on/off state of the second button 166 is written to the bit 2, data indicative of an on/off state of the third button 168 is written to the bit 1, and data indicative of an on/off state of the fourth button 170 is written to the bit 0. Furthermore, data "0" for identifying the controller 100 (percussion type controller) is written to the bit 7 of the second byte. In addition, data indicative of the presence or absence (on/off) of a sound input to the microphone 124 is written to the third byte. It is noted that in a case of outputting volume data to the game apparatus, the data value ("00000000"-"11111111") corresponding to the volume is written to the third byte.

It is noted that as shown in FIG. 1, the controller 100 is provided with a START/PAUSE button 174, and therefore, data indicative of an on/off state is written to the bit 4 of the first byte.

Figure 8:
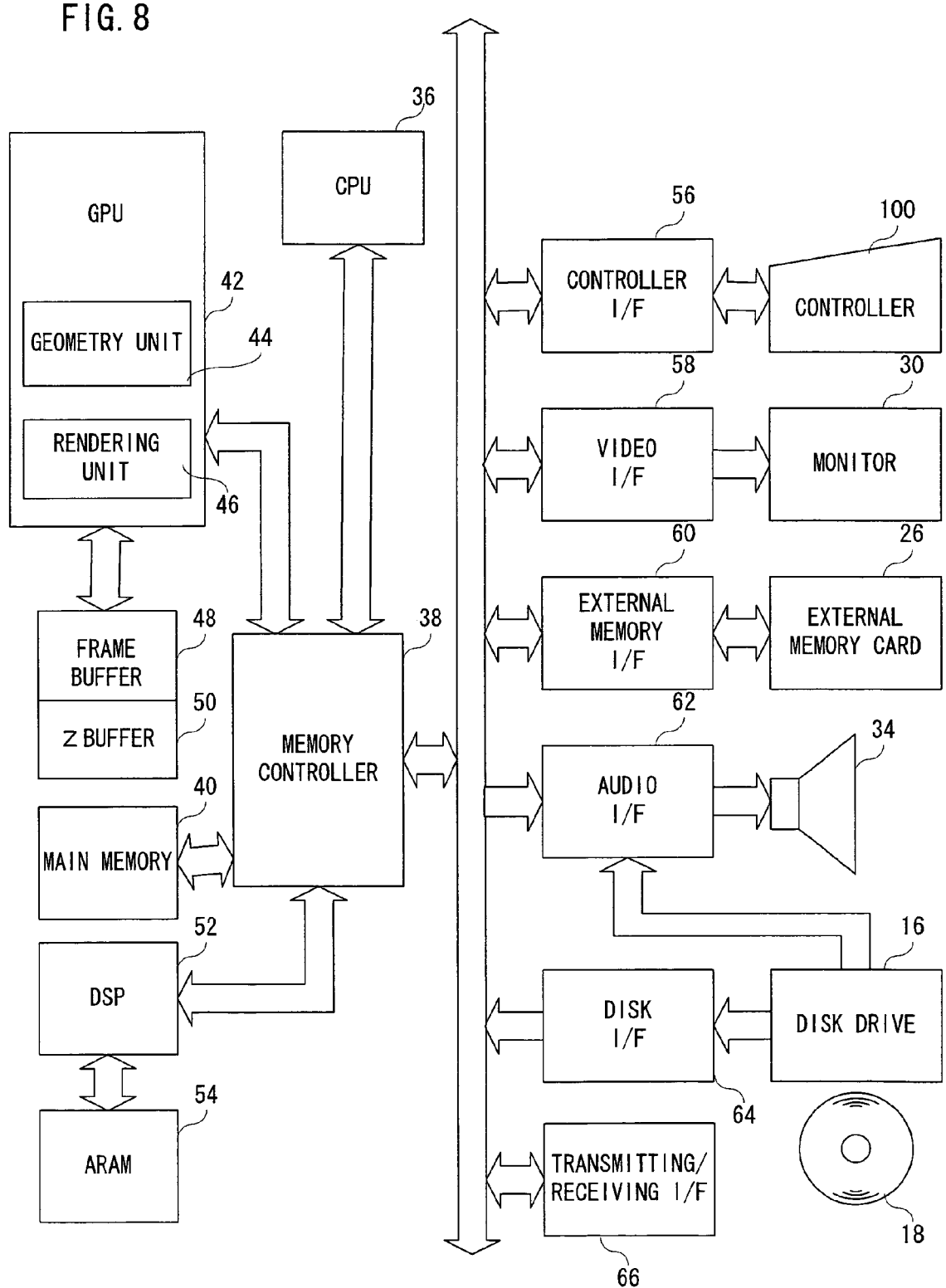
FIG. 8 is a block diagram showing an electric configuration of FIG. 1 embodiment.

FIG. 8 is a block diagram showing an electrical configuration of the video game system 10 of FIG. 1 embodiment. The video game apparatus 12 is provided with a central processing unit (hereinafter, may be referred to as "CPU") 36. The CPU 36 is called a computer or a processor, and is in charge of governing overall control of the video game apparatus 12. The CPU 36 or the computer functions as a game processor, and is connected with a memory controller 38 via a bus. The memory controller 38 mainly controls writing to and reading from a main memory 40 connected via a bus under control of the CPU 36. The memory controller 38 is coupled with a GPU (Graphics Processing Unit) 42.

The GPU 42 forms a part of a rendering means, is constructed by a single chip ASIC, for example, and receives a graphics command (a construction command) from the CPU 36 via the memory controller 38 and then, in response to the command, generates the three-dimension (3D) game image by a geometry unit 44 and a rendering unit 46. Specifically, the geometry unit 44 performs a coordinate operation process such as turn-around or rotation, movement, transformation and etc. of a variety of characters and objects (which is formed by a plurality of polygons, and the polygon is a polygonal plane defined by at least three vertex coordinates) in a three-dimension coordinates system. The rendering unit 46 performs an image generating process such as pasting a texture (pattern image) on each of polygons of the variety of objects, and so on. Accordingly, three-dimension image data to be displayed on the game screen is produced by the GPU 42, and the image data is rendered (stored) in the frame buffer 48.

It is noted that data (primitive, polygon, texture and etc.) required for executing the construction command by the GPU 42 is acquired from the main memory 40 via the memory controller 38.

The frame buffer 48 is a memory for rendering (storing) one frame of image data of the raster scan monitor 30, for example, and is rewritten by the GPU 42 every frame. A video I/F 58 described later reads the data stored in the frame buffer 48 via the memory controller 38, and whereby the 3D game image is displayed on the screen of the monitor 30.

Furthermore, a Z buffer 50 has a storage capacity equal to the number of pixels (storing positions or addresses) corresponding to the frame buffer 48× the number of bits of depth data per one pixel, and stores depth information or depth data (Z value) of dots corresponding to respective storing positions of the frame buffer 48.

It is noted that the frame buffer 48 and the Z buffer 50 may be constructed by utilizing a part of the main memory 40.

The memory controller 38 is also connected to an ARAM 54 via a DSP (Digital Signal Processor) 52. Accordingly, the memory controller 38 controls writing to and/or reading from the ARAM 54 as a sub memory in addition to the main memory 40.

The DSP 52 functions as a sound processor, and generates audio data corresponding to a sound required for the game (effective sound), a sound, or music (BGM) by use of sound wave form data (see FIG. 5) written to the ARAM 54.

The memory controller 38 is further connected to respective interfaces (I/F) 56, 58, 60, 62 and 64 by buses. The controller I/F 56 is an interface for the controller 100, and applies an operation signal or data from the controller IC 162 (FIG. 6) of the controller 100 to the CPU 36 through the memory controller 38. The video I/F 58 accesses the frame buffer 48 to read the image data formed by the GPU 42, and applies the image signal or the image data (digital RGB pixel values) to the monitor 30 via the AV cable 28 (FIG. 1).

The external memory I/F 60 makes the memory card 26 (FIG. 1) which is inserted into the front surface of the video game apparatus 12 communicate to the memory controller 38. This allows the CPU 36 to write and read the data to and from the memory card 26 via the memory controller 38. The audio I/F 62 receives audio data applied from the DSP 52 through the memory controller 38 or an audio stream read from the optical disk 18, and then applies an audio signal (sound signal) corresponding thereto to the speaker 34 of the monitor 30.

In addition, in a case of a stereo sound, the speaker 34 is provided at least one at left and right. Therefore, through a surround process, it is possible to hear a sound in a manner that the sound is generated from rear side of the player even if only two front left and right speakers are provided.

The disk I/F 64 connects the disk drive 16 to the memory controller 38, and whereby the CPU 36 controls the disk drive 16. The disk drive 16 writes the program data, the texture data and etc. read from the optical disk 18 to the main memory 40 under control of the CPU 36.

Figure 9:
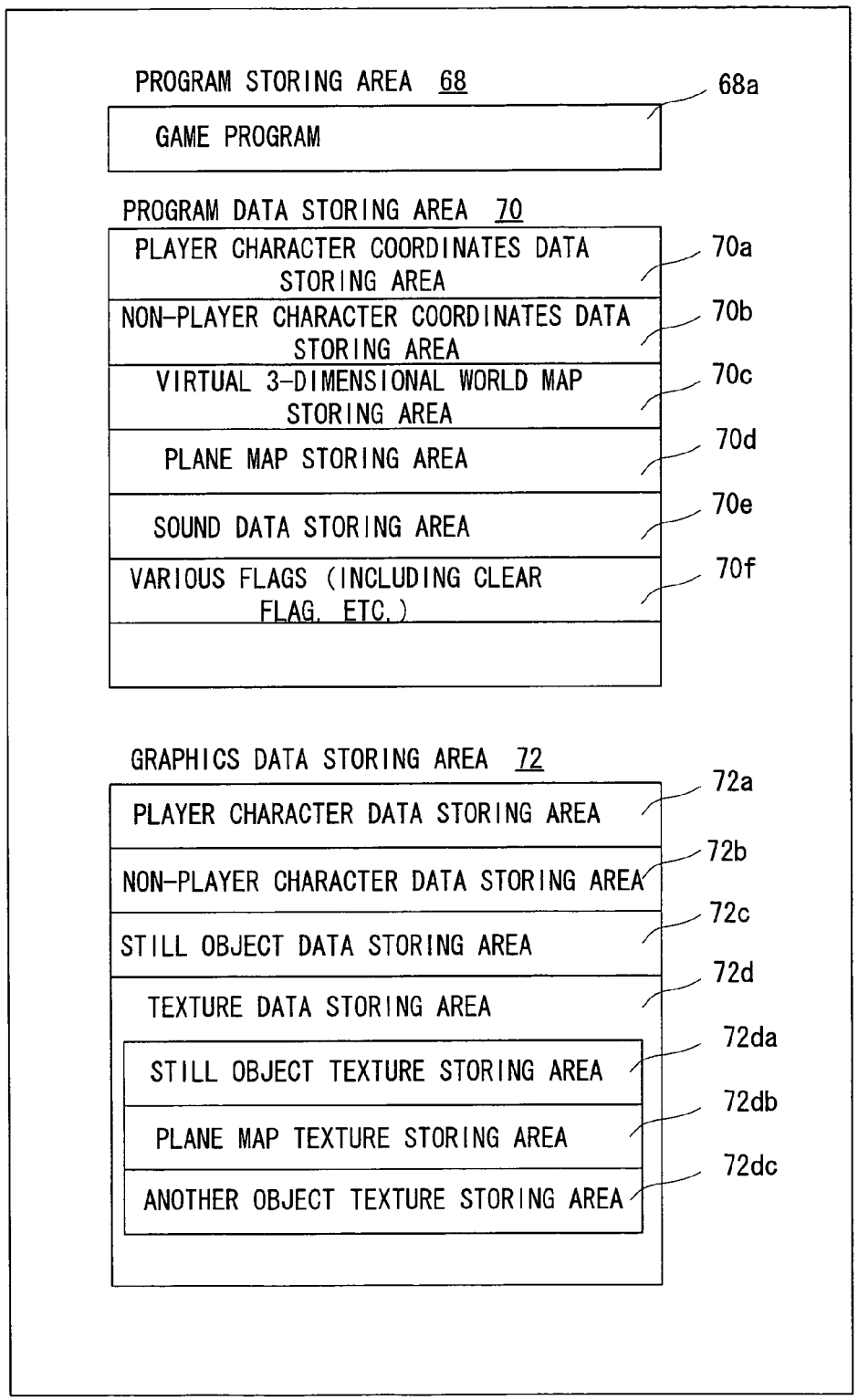
FIG. 9 is an illustrative view showing one example of a memory map of a main memory in FIG. 8 embodiment.

FIG. 9 shows a memory map of the main memory 40. The main memory 40 includes a program storing area 68, a program data storing area 70 and a graphics data storing area 72.

In the game program storing area 68, the game program read from the optical disk 18 is stored at a time or partially and sequentially.

In the program data storing area 70 also, the program data read from the optical disk 18 is stored at a time or partially and sequentially. The program data includes coordinates data of models of a character and an object, for example. The program data storing area 70 includes a player character coordinates data storing area 70a for storing coordinates data (coordinates data of an initial position) of a character (player character or player object) moveable within a game world and subjected to another arbitrary operation according to an operation of the controller 100 by the game player, and a non-player character coordinates data storing area 70b storing coordinates data (coordinates data of an initial position) of a character except for the player character (non-player character: character not operable or controllable by the game player) such as an enemy character, a fairy character, etc. The program data storing area 70 includes a storing area 70c for storing a map of displaying a virtual 3-dimensional game world (virtual 3-dimensional space map), a storing area 70d for storing a plane map representative of a plane obtained by viewing the virtual 3-dimensional game world from above, a storing area 70e for storing sound data for a game music and a sound effect, and a storing area 70f for various flags and registers. It is noted that the coordinates data is changed in correspondence with an advance of the game.

In the graphics data storing area 72 also, the graphics data read from the optical disk 18 is stored at a time or partially and sequentially. The graphics data is data relating to rendering such as a color, transparency, etc. The graphics data storing area 72 includes a storing area 72a for storing data (polygon list, etc.) such as a polygon, and so on of the above-described player character, a storing area 72b for storing data (polygon list, etc.) of the polygon, and so on of the enemy character, a storing area 72c for storing data of a polygon, and so on of a still object (wall object, ground object, etc.), and a storing area 72d for storing texture data. Then, a texture data storing area 72d includes a storing area 72da for storing a still object texture to be pasted on each of the surfaces of the above-described still object, a storing area 72db for storing a plane map texture to be pasted on the above-described plane map, and a storing area 72dc for storing a texture to be pasted on another object and character.

Figure 10:
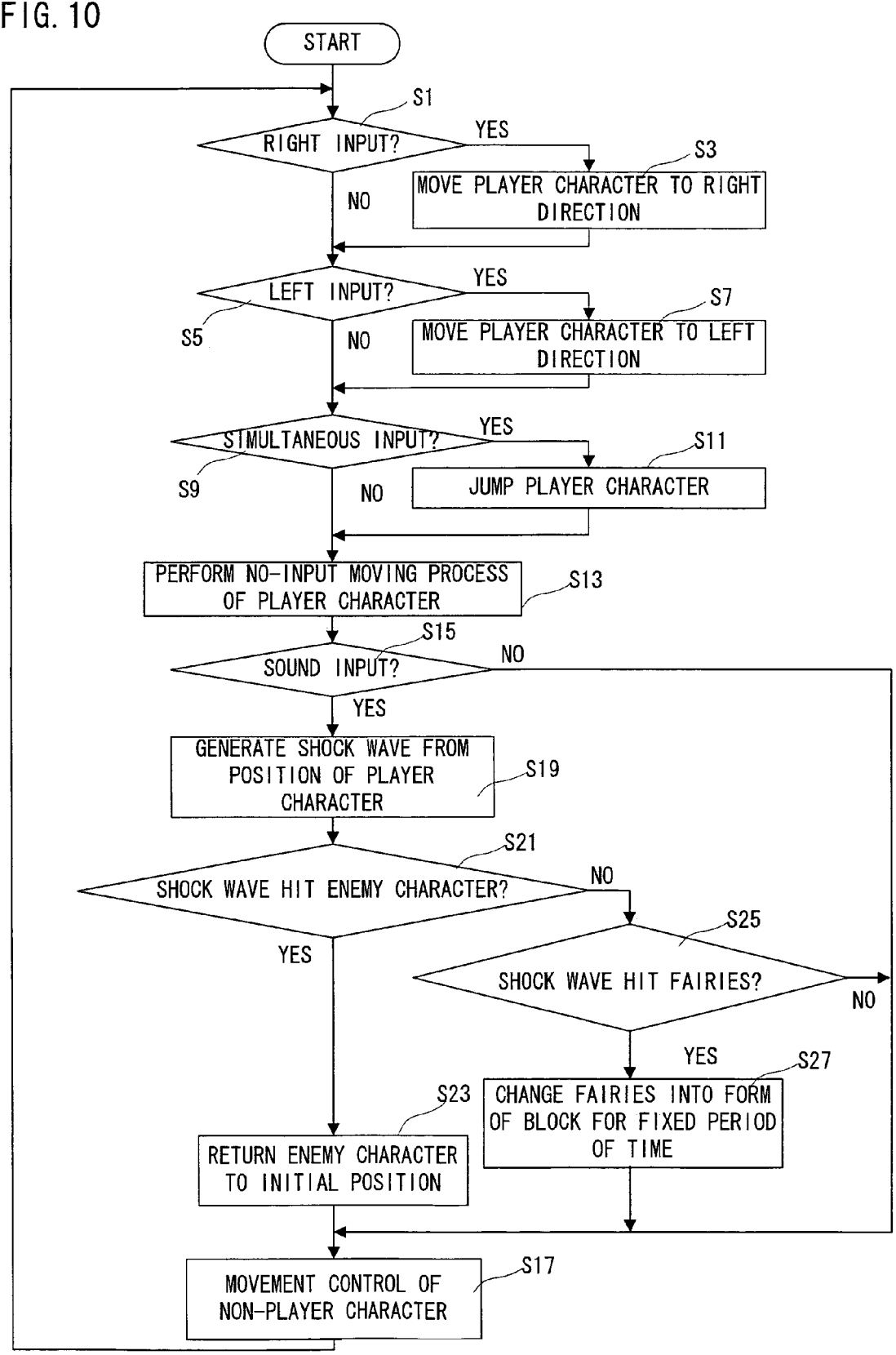
FIG. 10 is a flowchart showing one example of an operation of FIG. 1 embodiment.

Referring to FIG. 10, in the game system 10 of FIG. 1 embodiment, after a power supply of the game apparatus 12 is turned on, and the start switch 118 of the controller 100 is depressed, a game is started. Then, the CPU 36 (FIG. 8) watches an operation signal or controller data shown in FIG. 7 input through the controller I/F 56 (FIG. 8) from the controller IC 162 (FIG. 6).

As described above, when the player performs a beating operation on the first operation surface 120, the first button 164 or the second button 166 (FIG. 6) is turned on, and whereby, on-data of the first button 164 (left operation signal) is written to the bit 3 of the first byte in FIG. 7, or on-data of the second button 166 (left operation signal) is written to the bit 2.

Furthermore, when the player performs a beating operation on the second operation surface 122, the third button 168 or the fourth button 170 (FIG. 6) is turned on, and whereby, on-data of the third button 168 (right operation signal) is written to the bit 1 of the first byte in FIG. 7, or on-data of the fourth button 170 (right operation signal) is written to the bit 0.

Figure 11:
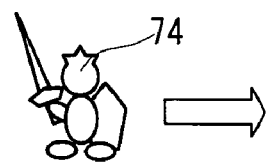
FIG. 11 is an illustrative view showing a movement of the player character when a beating operation is performed on a right beating operation surface in FIG. 1 embodiment.
Figure 12:
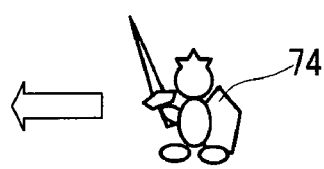
FIG. 12 is an illustrative view showing a movement of the player character when a beating operation is performed on a left beating operation surface in FIG. 1 embodiment.

Then, when the player performs a beating operation on the first operation surface, the CPU 36 detects a left operation signal in a step S1, and moves to the left direction a player character (first character) 74 appearing in the game world or the virtual world displayed on the screen 32 of the monitor 30 (FIG. 1) as shown in FIG. 11 in a step S3 that is one example of a first processing means (first movement means). Similarly when the player performs a beating operation on the second beating operation surface 122, the CPU 36 detects a right operation signal in a step S5, and moves the player character 74 appearing in the virtual world to the right direction as shown in FIG. 12 in a step S7 that is one example of the first processing means (second movement means). Furthermore, when a left operation signal and a right operation signal are simultaneously detected in a step S9, that is, when the player simultaneously performs beating operations on the first beating operation surface 120 and the second beating operation surface 122, the CPU 36 jumps the player character 74 appearing in the virtual world in a step S11 that is one example of the first processing means.

Accordingly, the player performs a beating operation on the first (left) beating operation surface 120 or the second (right) beating operation surface 122 of the percussion type controller 100, and whereby, the player character 74 is allowed to be moved in the left direction or the right direction in the virtual world. Furthermore, the player simultaneously performs beating operations on the first beating operation surface 120 and the second beating operation surface 122, and whereby, the player character 74 is allowed to be jumped (move in an upper direction) in the virtual world. Thus, it is possible to realize a game to be played with an unconventional and novel and fresh game operation.

It is noted that when the first beating operation surface 120 and the second beating operation surface 122 are continuously beaten, it is appropriate that in correspondence with a beating speed, in a case of a high speed, that is, a short beating time interval, a movement acceleration is rendered large, and conversely, in a case of a long beating time interval, the movement acceleration is rendered small.

When an operation signal according to the beating operation is not included in the controller data of the controller 100, that is, when the player performs no beating operation on the first beating operation surface 120 and the second beating operation surface 122, the CPU 36 moves the first character 74 in a predetermined direction at a predetermined speed, for example, in a step S13 that is one example of the first processing means (third movement means).

In the above-described step S13, a no-input movement control is executed. Accordingly, while moving the character 74 by the no-input movement control, the player can apply a sound input by clapping his hands released from the operation surface.

It is noted that in the step S13, the third means is adequately changeable such as not only moving the first character 74 with constant speed, but also inertially moving it after no beating operation, and then stopping it, and so forth.

For example, according to a beating operation on the first operation surface and a beating operation on the second operation surface, a moving speed and moving acceleration, etc. of the first character moving in the virtual world can be determined. Then, even after the beating operation on the first operation surface and the beating operation on the second operation surface are absent, the third movement means (step S13) inertially moves the first character on the basis of the determined moving speed and moving acceleration for a fixed period of time. Then, after a lapse of the fixed period of time, the first character is stopped. That is, although at a time of no beating operation, the first character always performs straight movement with a constant speed in this embodiment, the movement of the first character 74 is changeable as necessary such as inertially moving even after no beating operation, and then being stopped, and so forth.

The CPU 36 further determines whether or not a sound input is present in a step S15. Data of presence or absence (on/off) of a sound input to the microphone 124 is written to the third byte in FIG. 7, and data of loudness of the sound (volume) is similarly written to the third byte as a volume data value ("00000000"-"11111111"). Accordingly, when watching the volume data of the third byte of the controller data, and determining that each of the data is equal to or more than the constant, that is, determining that sound input equal to or more than a threshold value is present, the CPU 36 determines "YES" in the step S15.

When the CPU 36 determines no sound input, "NO" is determined in the step S15, then, the process proceeds to a step S17. In the step S17 that is one example of the third processing means, a movement control of the enemy character 78 (FIG. 13) and the fairies 80 (FIG. 14) both being non-player characters is performed.

More specifically, the enemy character 78 is arranged at its initial position on the basis of the non-player character coordinates data 70b (FIG. 9) by the CPU 36, for example. However, in the step S17, the enemy character 78 is subjected to the movement control toward the direction of the player character 74, for example, at a predetermined speed. The enemy character 78 makes an attack on the player character 74, and hinders its advance, and causes a minus game evaluation such as decrease of the life of the player, and so forth when the enemy character 78 contacts the player character 74.

Figure 14:
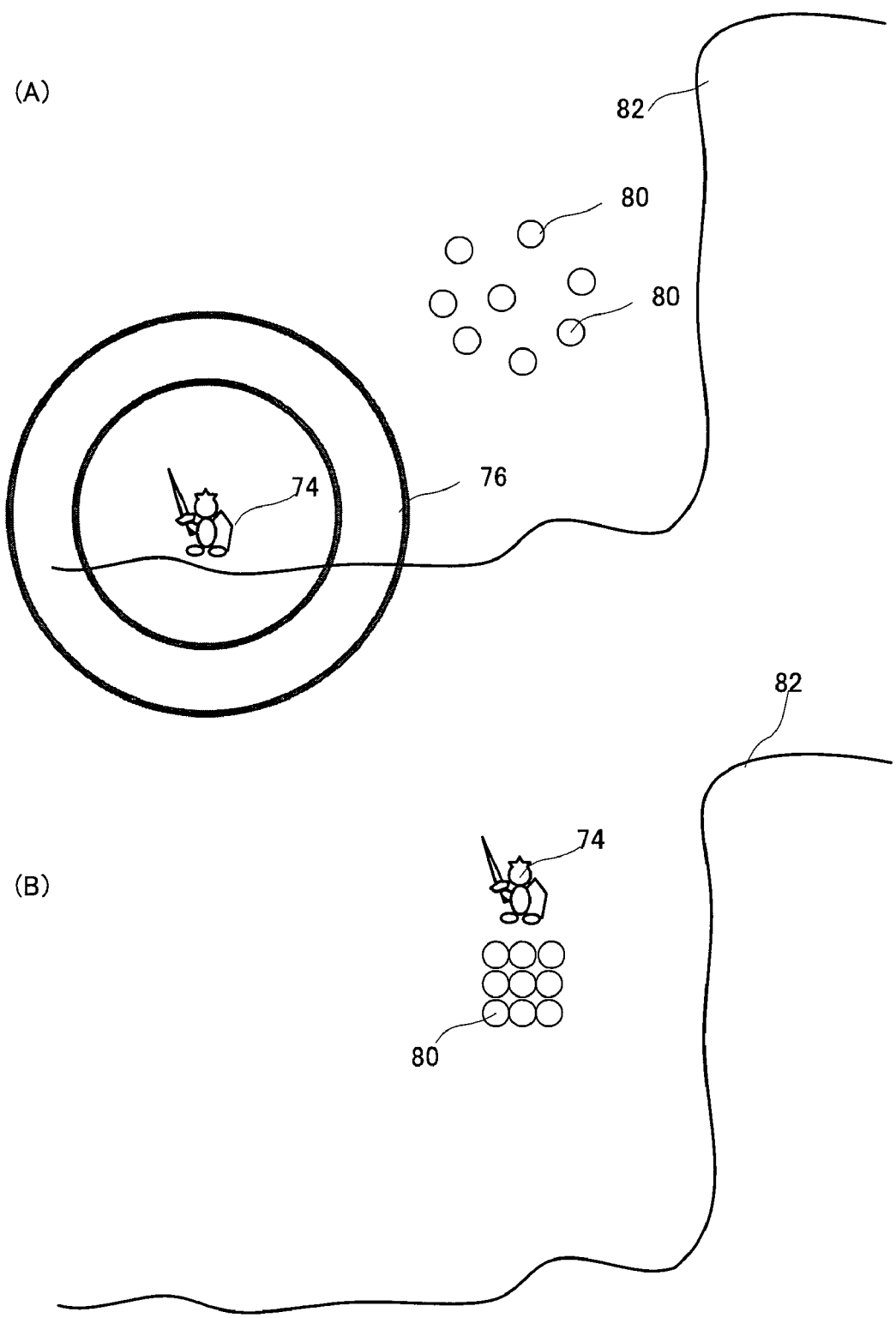
FIG. 14 is an illustrative view showing generation of a shock wave and a movement of fairy characters according thereto when a sound input is applied by clapping in the vicinity of the controller in FIG. 1 embodiment.

Furthermore, the fairy character 80 is similarly arranged at its initial position on the basis of the non-player character coordinates data 70b (FIG. 9) by the CPU 36, for example. However, in the step S17, the fairy character 80 is subjected to the movement control from right to left or up and down at a predetermined speed near the player character 74 as shown in FIG. 14 (a) as if insects fly in the air, for example. In this embodiment, the fairies 80 help the player character 74 as described later rather than damages the player character 74.

Thus, in the state of no sound input, the enemy character and other non-player characters are subjected to movement control as necessary.

Figure 13:
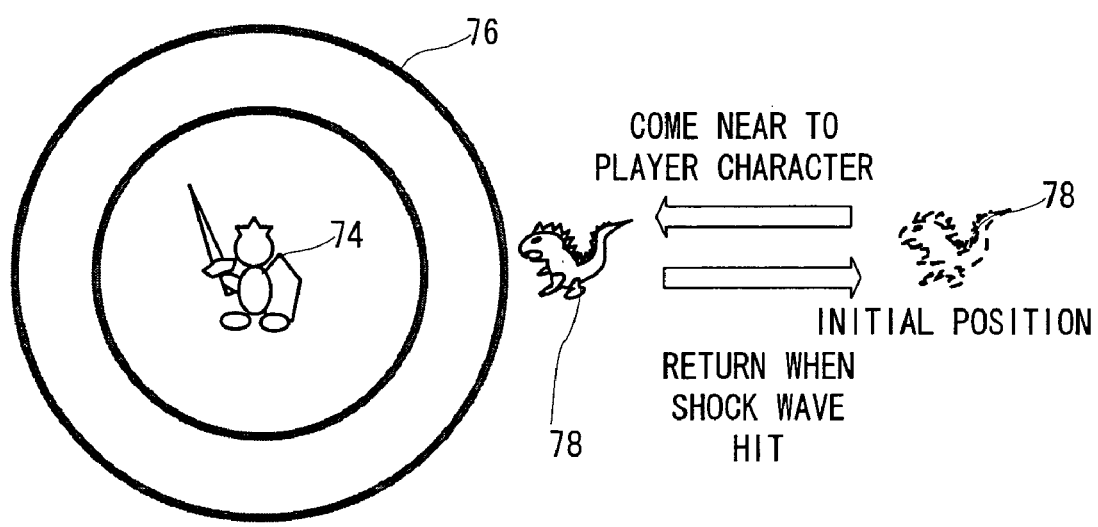
FIG. 13 is an illustrative view showing a generation of a shock wave and a movement of an enemy character according thereto as one example of a movement when a sound input is applied by clapping in the vicinity of the controller in FIG. 1 embodiment.

Then, when a sound input is detected to determine "YES" in the step S15, the CPU 36 executes a movement relating to the first character, that is, the player character in a step S19 that is one example of the second processing means (movement means). More specifically, a shock wave 76 is generated from a position of the player character 74 as shown in FIG. 13. The shock wave 76 is displayed such that it widens like a ripple with the position of the character 74 taken as the center, and disappears. At this time, when the enemy character 78 being the second character or the non-player character exists within a predetermined range to be influenced by the shock wave 76 (that is, a predetermined area determined by taking a position of the player character 74 at a certain point as a reference), the shock wave 76 hits the enemy character 78.

Here, the CPU 36 determines whether or not the shock wave hits the enemy character 78 in a step S21. More specifically, it is determined whether or not a collision between the shock wave 76 and the enemy character 78 is present. If "YES" is determined in the step S21, the CPU 36 returns the enemy character 78 to its initial position in a step S23 that is a second processing means as shown in FIG. 13. Accordingly, it is possible to keep the enemy character 78 doing a bad thing to the player character 74 at a distance from the player character 74 by a sound input.

Thus, when a sound input is applied by clapping, etc. near the microphone 124 in FIG. 1 at a time that the enemy character 78 comes near to the player character 74, the enemy character 78 is returned to the initial position, and therefore, the player character 74 is never hindered by the enemy character 78. It is noted that in a case of no sound input, the enemy character 78 is moved to the direction of the player character 74 once again (step S17).

It is noted that if "NO" is determined in the step S21, it is determined whether or not the shock wave 76 generated in the step S19 hits the fairies 80 in a succeeding step S25. More specifically, it is determined whether or not the collision between the shock wave 76 and the fairies 80 is present. If "YES" is determined in the step S25, the CPU 36 consisting of the second processing means changes the movement of the fairies 80 (in the step S17) such that the fairies 80 gather in a form of block as shown in FIG. 14 (B) for a fixed period of time in a step S27. When the fairies 80 gather in the form of block as a group, the player character 74 can ride on it by jumping, for example. Accordingly, the player character 74 can easily jump over a wall 82 that cannot be passed by itself by jumping up from the fairy block.

For example, when the second beating operation surface 122 is successively beaten to render the moving acceleration of the player character 74 large, and a sound input (clapping) is made, the shock wave 76 is generated so as to hit the fairies 80, which changes the fairies 80 into the block form. Thus, by simultaneously performing a right and left beating operation, the player character 74 is jumped (in the step S11) to stand on the block of the fairies 80, and is jumped once again to stand on the wall 82. That is, the fairies 80 are helpful to the player character 74. That is, by mixing a beating operation and a clapping operation in good timing, the player character can ride on the wall 82.

It is noted that a description is made that the fairies 80 are hit by the shock wave to change into the footing in the form of the block as an assistant of the player character. However, as such the change of movement when the fairies or its similar character is hit by the shock wave, the fairies may take shape of an arrow to indicate a direction to which the player character 74 has to proceed, or to indicate an existence of an important item, for example.

Furthermore, in the above-described embodiment, when a left operation signal or a right operation signal is input, the player character is subjected to the movement control in the left direction or the right direction at a set speed. However, depending on whether a left operation signal from the first button 164 or a left operation signal from the second button 166, a moving speed to the left direction may be changed. Similarly, depending on whether a right operation signal from the third button 168 or a right operation signal from the fourth button 170, a moving speed to the right direction may be changed. In this case, next to the step S1 in FIG. 10, whether the third button or the fourth button is determined, or next to the step S5, whether the first button or the second button is determined, and depending on these determinations, different moving speeds may be set.

It is noted that in a case that the on-data of the first button 164 is continuously detected, when an interval between each of the signals is equal to or less than the predetermined time period, it is determined that the first beating operation surface 120 is subjected to a continuous depressing operation without the beating operation, the on-data in the second and successive processing may be neglected. In this case, the process proceeds to "NO" in the step S1. This is true for the on-data of the second button 166. Thus, in a case that the first beating operation surface and the second beating operation surface are subjected to a depressing operation, an adequate game operation cannot be performed, and therefore, it is possible to guide the player to the beating operation.

Furthermore, in a case that a sound input is detected at the same time that or directly before the on-data of the first button 164 or the second button 166 is detected, by determining that the sound input is caused by the beating operation, the sound input may be neglected. In this case, the process proceeds to "NO" in the step S15.

In addition, in the above-described embodiment, when a sound input is applied at a time that the second character appears, as a "predetermined change in the virtual world", the enemy character being the second character is returned to the initial position, the fairies being the second character are arranged in the form of the block, and so forth. However, the "predetermined change in the virtual world" here includes, except for these examples, allowing the player to acquire an item (second character) satisfying a relative positional relationship, damaging the enemy character (second character) satisfying a relative positional relationship, and so forth.

Although the illustrative embodiments have been described and illustrated in detail, it is clearly understood that the same is by way of illustration and example only and is not to be taken by way of limitation, the spirit and scope of the present invention being limited only by the terms of the appended claims.

What is claimed is:

1. A game system for advancing a game in accordance with a player's beating operation and a sound input by causing a player character and a non-player character to appear in a virtual world on the basis of a game program, comprising:
   a percussion-instrument-type controller formed to imitate a percussion instrument and to have a first operation surface and a second operation surface, each of which is subjected to elastic deformation by a beating operation with a hand of a player, wherein each of said first operation surface and said second operation surface comprises plurality of buttons, and said player activates one or more of said buttons by the beating operation to generate operation signal;
   said percussion-instrument-type controller outputting said operation signal according to the beating operation;
   a first moving programmed logic circuitry which moves said player character in a first manner in response to said operation signal according to the beating operation on said first operation surface of said percussion-instrument-type controller;
   a second moving programmed logic circuitry which moves said player character in a second manner in response to said operation signal according to the beating operation on said second operation surface of said percussion-instrument-type controller, wherein moving speed and moving acceleration of said player character within the virtual world is determined by the beating operation on said first operation surface and/or the beating operation on said second operation surface, where a short beating time interval renders a large movement acceleration and a long beating time interval renders a small movement acceleration;
   a third moving programmed logic circuitry which moves said player character in a third manner so that said player character moves in a predetermined direction at a predetermined speed when no beating operation is performed on said first operation surface and said second operation surface of said percussion-instrument-type controller for a predetermined time period;
   a causing programmed logic circuitry which causes said player character to perform an action in response to the operation signal due to simultaneous beating operations on said first operation surface and said second operation surface of said percussion-instrument-type controller for a predetermined time period;
   a sound input device for inputting a sound signal;
   a shock wave producing programmed logic circuitry which produces a shock wave emanating from a position of said player character in said virtual world in response to the sound input from said sound input device; and
   a changing programmed logic circuitry which changes an action of said non-player character at a time that said non-player character is affected by said shock wave in said virtual world.

2. The game system according to claim 1, wherein said first operation surface and said second operation surface have a size including a circle having a diameter of at least 3 cm when viewed from above.

3. The game system according to claim 1, wherein said percussion-instrument-type controller resembles a shape of a percussion instrument.

4. The game system according to claim 1, wherein said first moving programmed logic circuitry and said second moving programmed logic circuitry ignores said operation signal from said percussion-instrument-type controller if said operation signal is continuous within a predetermined time interval.

5. The game system according to claim 1, wherein said sound input device is provided on said percussion-instrument-type controller.

6. The game system according to claim 5, wherein said sound input device is provided in proximity to said first operation surface and said second operation surface.

7. The game system according to claim 1, wherein said percussion-instrument-type controller includes a first housing for supporting the first operation surface, a second housing for supporting the second operation surface, and a connecting portion for connecting said first housing and said second housing; and
   said sound input device includes a microphone provided on said connecting portion.

8. The game system according to claim 5, wherein said shock wave producing programmed logic circuitry ignores, when the operation signal is present from said percussion-instrument-type controller, a sound signal from said sound input device inputted within a predetermined time period.

9. The game system according to claim 1, wherein said first moving programmed logic circuitry moves said player character in a first direction according to said operation signal from said beating operation on said first operation surface; and
   said second movement programmed logic circuitry moves said player character in a second direction according to said operation signal from said beating operation on said second operation surface.

10. The game system according to claim 1, further comprising:
    a non-player character generator which causes said non-player character to appear in a predetermined position of said virtual world;
    wherein said shock wave producing programmed logic circuitry generates a predetermined change according to a relative positional relationship in the virtual world between said player character and said non-player character in said virtual world when said sound signal is present.

11. The game system according to claim 10, wherein said shock wave producing programmed logic circuitry performs a predetermined process in association with said non-player character existing within a predetermined area, taking the position of said player character in said virtual world as a reference when said sound signal is present.

12. The game system according to claim 10, further comprising a fourth moving programmed logic circuitry which controls movement of said non-player character;
Wherein said shock wave producing programmed logic circuitry changes the movement of said non-player character by said fourth moving programmed logic circuitry in association with said non-player character existing within said predetermined area, taking the position of said player character in said virtual world as a reference when said sound signal is present.

13. The game system according to claim 12, wherein said non-player character generator causes said non-player character to appear in an initial position of said virtual world;
said fourth moving programmed logic circuitry moves said non-player character from said initial position toward said player character; and
said shock wave producing programmed logic circuitry returns said non-player character to said initial position, taking the position of said player character in said virtual world as a reference when said sound signal is present.

14. A non-transitory recording medium recording a game program causing a game system, provided with a percussion-instrument-type controller formed to imitate a percussion instrument for outputting an operation signal according to a player's beating operation;
said percussion-instrument-type controller comprises elastically deformable first operation surface and second operation surface, wherein each of said first operation surface and said second operation surface comprises plurality of buttons, and said player activates one or more of said buttons by the beating operation to generate said operation signal; and
a sound input device for generating a sound signal, to execute a game in accordance with the player's beating operation and the sound input where a player character and a non-player character appear in a virtual world;
wherein said game program causes said game system to perform:
first moving which moves said player character in a first manner in response to said operation signal according to the beating operation on said first operation surface of said percussion-instrument-type controller;
second moving which moves said player character in a second manner in response to said operation signal according to the beating operation on said second operation surface of said percussion-instrument-type controller, wherein moving speed and moving acceleration of said player character within the virtual world is determined by the beating operation on said first operation surface and/or the beating operation on said second operation surface, where a short beating time interval renders a large movement acceleration and a long beating time interval renders a small movement acceleration;
third moving which moves said player character in a third manner so that said player character moves in a predetermined direction at a predetermined speed when no beating operation is performed on said first operation surface and said second operation surface of said percussion-instrument-type controller for a predetermined time period;
causing said player character to perform an action in response to the operation signal due to simultaneous beating operations on said first operation surface and said second operation surface of said percussion-instrument-type controller for a predetermined time period;
shock wave producing which produces a shock wave emanating from a position of said player character in said virtual world in response to the sound input from said sound input device; and
changing an action of said non-player character at a time that said non-player character is affected by said shock wave in said virtual world.

15. The non-transitory recording medium according to claim 14, wherein said game program further causes said game system to perform:
non-player character generating which causes said non-player character to appear in a predetermined position of said virtual world; and
shock wave producing which generates a predetermined change in said virtual world according to a relative positional relationship between said player character and said non-player character in said virtual world when said sound signal is present.

16. A method for advancing a game in accordance with a player's beating operation and a sound input by causing a player character and a non-player character to appear in a virtual world on the basis of a game program, the method comprising:
subjecting elastic deformation by a beating operation with a hand of a player to a first operation surface and a second operation surface of a percussion-instrument-type controller formed to imitate a percussion instrument, wherein each of said first operation surface and said second operation surface comprises plurality of buttons, and said player activates one or more of said buttons by the beating operation to generate operation signal;
said percussion-instrument-type controller outputting said operation signal according to the beating operation,
first moving, using a microprocessor, for moving said player character in a first manner in response to said operation signal according to the beating operation on said first operation surface of said percussion-instrument-type controller;
second moving, using said microprocessor, for moving said player character in a second manner in response to said operation signal according to the beating operation on said second operation surface of said percussion-instrument-type controller, wherein moving speed and moving acceleration of said player character within the virtual world is determined by the beating operation on said first operation surface and/or the beating operation on said second operation surface, where a short beating time interval renders a large movement acceleration and a long beating time interval renders a small movement acceleration;
third moving, using said microprocessor, for moving said player character in a third manner so that said player character moves in a predetermined direction at a predetermined speed when no beating operation is performed on said first operation surface and said second operation surface of said percussion-instrument-type controller for a predetermined time period;
causing, using said microprocessor, said player character to perform an action in response to the operation signal due to simultaneous beating operations on said first operation surface and said second operation surface of said percussion-instrument-type controller for a predetermined time period;

inputting a sound signal from a sound input device, producing, using said microprocessor, a shock wave emanating from a position of said player character in said virtual world in response to the sound input from said sound input device; and changing, using said microprocessor, an action of said non-player character at a time that said non-player character is affected by said shock wave in said virtual world.

17. The method for advancing a game in accordance with a player's beating operation and a sound input according to claim 16, said method further comprising:

non-player character generating which causes said non-player character to appear in a predetermined position of said virtual world; and shock wave producing which generates a predetermined change in said virtual world according to a relative positional relationship between said player character and said non-player character in said virtual world when said sound signal is present.

18. The method for advancing a game in accordance with a player's beating operation and a sound input according to claim 17, wherein said shock wave producing performs a predetermined process in association with said non-player character existing within said predetermined area, taking a position of said player character in said virtual world as a reference when said sound signal is present.

19. The method for advancing a game in accordance with a player's beating operation and a sound input according to claim 17, further comprising:

fourth moving which controls a movement of said non-player character;

wherein said shock wave producing changes the movement of said non-player character by said fourth moving in association with said non-player character existing within said predetermined area, taking a position of said player character in said virtual world as a reference when said sound signal is present.

20. The method for advancing a game in accordance with a player's beating operation and a sound input according to claim 19, wherein said non-player character generating causes said non-player character to appear in an initial position of said virtual world;

said fourth moving moves said non-player character from said initial position toward said player character; and said shock wave producing returns said non-player character to said initial position, taking a position of said player character in said virtual world as a reference when said sound signal is present.

* * * * *